(12) United States Patent
Windhab et al.

(10) Patent No.: US 12,416,611 B2
(45) Date of Patent: Sep. 16, 2025

(54) UNIQUE IDENTIFICATION AND AUTHENTICATION OF PRODUCTS

(71) Applicant: Evonik Operations GmbH, Essen (DE)

(72) Inventors: Norbert Windhab, Hofheim (DE); Kevin Burton, Hoover, AL (US); Paul Joseph Spencer, Oberursel (DE); Jessica Müller-Albers, Darmstadt (DE); Andrea Engel, Birmingham, AL (US); Peter Niepoth, Gross-Umstadt (DE); Rüdiger Alexowsky, Zahna-Elster (DE); Julia Lyubina, Dresden (DE); Christoph Brücher, Eschborn (DE); Carsten Dentler, Bad Homburg (DE); Andreas Karau, Gelnhausen (DE)

(73) Assignee: Evonik Operations GmbH, Essen (DE)

( * ) Notice: Subject to any disclaimer, the term of this patent is extended or adjusted under 35 U.S.C. 154(b) by 590 days.

(21) Appl. No.: 17/616,418

(22) PCT Filed: Jun. 4, 2020

(86) PCT No.: PCT/EP2020/065502
§ 371 (c)(1),
(2) Date: Dec. 3, 2021

(87) PCT Pub. No.: WO2020/245280
PCT Pub. Date: Dec. 10, 2020

(65) Prior Publication Data
US 2022/0326199 A1    Oct. 13, 2022

Related U.S. Application Data

(60) Provisional application No. 62/856,795, filed on Jun. 4, 2019.

(51) Int. Cl.
*G01N 30/86* (2006.01)
*G01D 7/04* (2006.01)
(Continued)

(52) U.S. Cl.
CPC ....... *G01N 30/8686* (2013.01); *G01R 33/302* (2013.01); *G01R 33/60* (2013.01);
(Continued)

(58) Field of Classification Search
CPC .. G01N 30/8686; G01N 24/10; G01R 33/302; G01R 33/60; G07D 7/04; H04L 9/3213; H04L 9/50
See application file for complete search history.

(56) References Cited

U.S. PATENT DOCUMENTS

| | | | |
|---|---|---|---|
| 4,376,264 A * | 3/1983 | Dokter | G07D 7/00 324/300 |
| 5,149,946 A | 9/1992 | Jerome et al. | |

(Continued)

FOREIGN PATENT DOCUMENTS

| | | |
|---|---|---|
| CN | 1082579 A | 2/1994 |
| RU | 2417898 C2 * | 5/2011 |

(Continued)

OTHER PUBLICATIONS

CN 1082579A machine translation, printed Jul. 2024 (Year: 2024).*
(Continued)

*Primary Examiner* — John C Kuan
(74) *Attorney, Agent, or Firm* — Oblon, McClelland, Maier & Neustadt, L.L.P.

(57) ABSTRACT

A method of unambiguous identification and authentication of products for the purpose of better recognition of product forgeries and controlling product piracy, including applying to/into the product an identification substance admixture which contains paramagnetic phases or identifying a product (Continued)

which contains an identification substance admixture containing paramagnetic phases and has an ESR fingerprint spectrum that permits unambiguous identification of the product. Such an ESR fingerprint spectrum is easily measurable, but can be copied or forged only with difficulty. The method relates to an individualizable "femto tag" for femto ledgers and forms an important interface for what are known as "Internet of Things" (IOT).

7 Claims, 16 Drawing Sheets

(51) Int. Cl.
    *G01N 24/10* (2006.01)
    *G01R 33/30* (2006.01)
    *G01R 33/60* (2006.01)
    *H04L 9/32* (2006.01)
    *G07D 7/04* (2016.01)
    *H04L 9/00* (2022.01)

(52) U.S. Cl.
    CPC ............... *G01N 24/10* (2013.01); *G07D 7/04* (2013.01); *H04L 9/3213* (2013.01); *H04L 9/50* (2022.05)

(56) References Cited

U.S. PATENT DOCUMENTS

| | | | | |
|---|---|---|---|---|
| 5,986,550 A * | 11/1999 | Rapaport | ............... | G01V 15/00 340/5.86 |
| 6,806,478 B1 * | 10/2004 | Hatfield | ................... | G09F 3/00 250/492.1 |
| 9,696,397 B2 * | 7/2017 | Rozenfeld | ............ | G01R 33/441 |
| 2010/0224819 A1 * | 9/2010 | Karelson | ............... | C08K 5/3417 252/62.51 R |
| 2014/0097842 A1 * | 4/2014 | Yang | ...................... | G01R 33/60 324/316 |
| 2020/0356085 A1 * | 11/2020 | Wentz | .................. | H04L 9/0866 |
| 2021/0279695 A1 * | 9/2021 | Rice | ........................ | G06Q 20/12 |

FOREIGN PATENT DOCUMENTS

WO        WO-9724699 A1 *  7/1997  ............ B82Y 10/00
WO    WO 2019/110321 A1    6/2019

OTHER PUBLICATIONS

International Search Report issued on Sep. 16, 2020 in PCT/EP2020/065502 filed on Jun. 4, 2020, 3 pages.

Extended European Search Report issued on Feb. 5, 2020 in European Patent Application No. 19180244.6, 11 pages.

Woo, C.-S. et al., "Multiple Watermark Method for Privacy Control and Tamper Detection in Medical Images," Proceedings of APRS Workshop on Digital Image Computing Australia, 2005, 6 total pages, XP055661973.

Mao, D. et al., "Novel Automatic Food Trading System Using Consortium Blockchain," Arabian Journal for Science and Engineering, vol. 44, 2019, pp. 3439-3455, XP036737449.

* cited by examiner

Fig. 2a: ESR spectra of powder mixtures of UB and MAG in various weight ratios, recorded at room temperature Fig. 2b: Second derivatives of the ESR spectra from Fig. 2a with respect to $H_{appl}$ Fig. 5: ESR spectra of thin films containing $Fe_3O_4$, ultramarine blue, MAG and UB in layers Fig. 6: ESR spectra: a) ultramarine blue (UB), b) phen(CuCl$_2$), c) UB and phen(CuCl$_2$) mixed in a weight ratio of 1:1, a) + b) direct sum of a) and b)

Fig. 7: ESR spectra of magnetite at various temperatures

Fig. 8: ESR spectra of ultramarine at 100 K and room temperature

Fig. 9: ESR spectra of ultramarine and magnetite as tablet (a) and suspended tablet (b)

Fig. 10

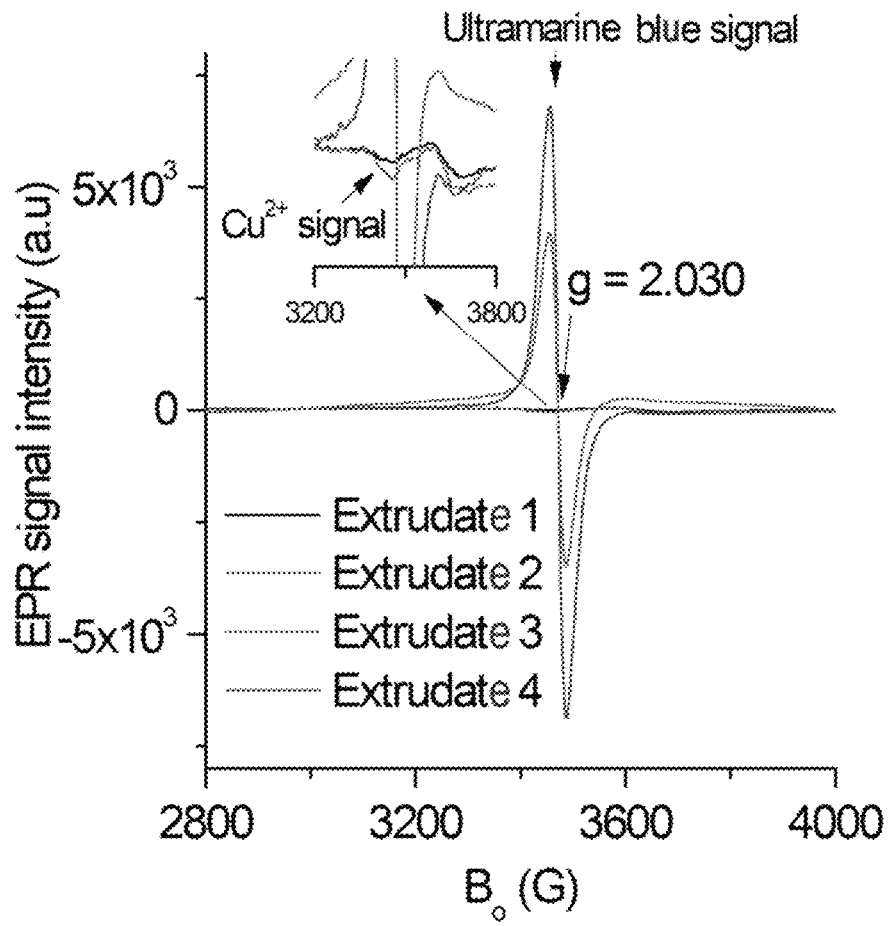

Fig. 10: ESR spectra (normalized to the same sample mass of 50 mg) of different extrudate samples measured at 20°C. Extrudate 2 shows a weak signal at about 3400 G that may be attributable to $Cu^{2+}$ species, even though no typical hyperfine structure of $Cu^{2+}$ is visible. The origin of the weak signals at around 3600 G in extrudates 1 and 2 is unclear. It is possibly due to a paramagnetic defect. Extrudates 3 and 4 show a strong ESR signal of ultramarine blue.

Fig. 11: ESR spectra of various paste samples (50 mg each), measured at 20°C, show the ESR signals of ultramarine blue (paste 5A and 5B) and $Cu^{2+}$ (paste 5C)

Fig. 12

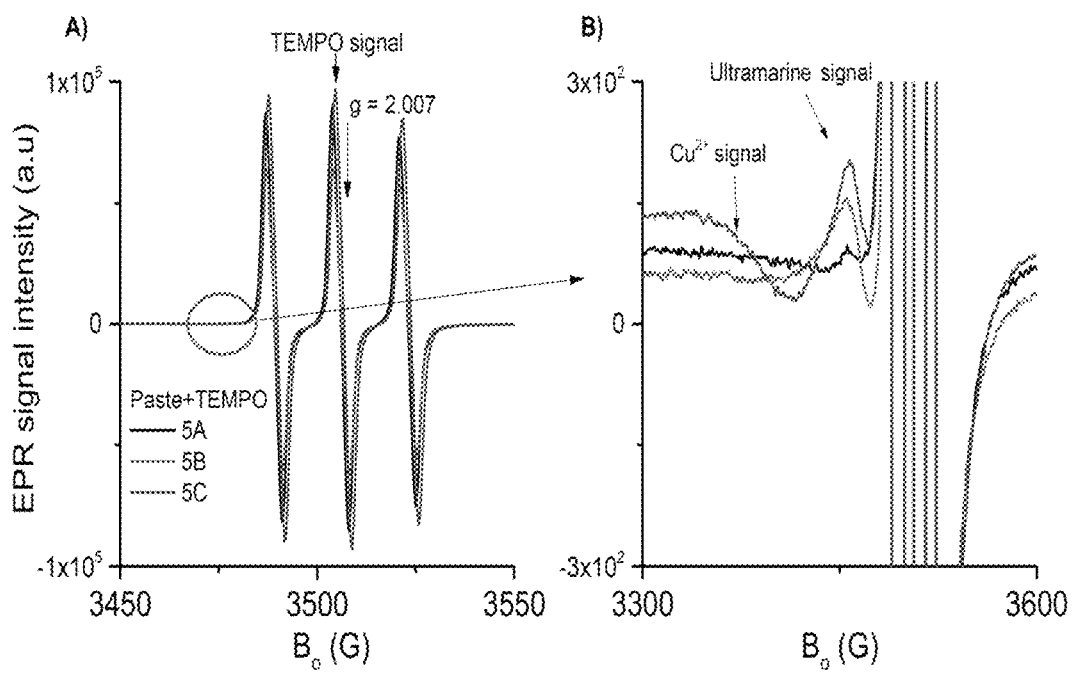

Fig. 12: ESR spectra of various paste samples (50 mg each) mixed with 0.02 mg of 2,2,6,6,6-tetramethyl-1-piperidinyloxyl (TEMPO radical) measured at 20°C. A) TEMPO signal; B) ultramarine blue signal (paste 5B and 5C; (red and blue lines) and $Cu^{2+}$ signal (paste 5C). The samples were prepared by mixing the individual paste with the TEMPO solution in acetone; the ESR spectra were measured after the evaporation of acetone (100 μl).

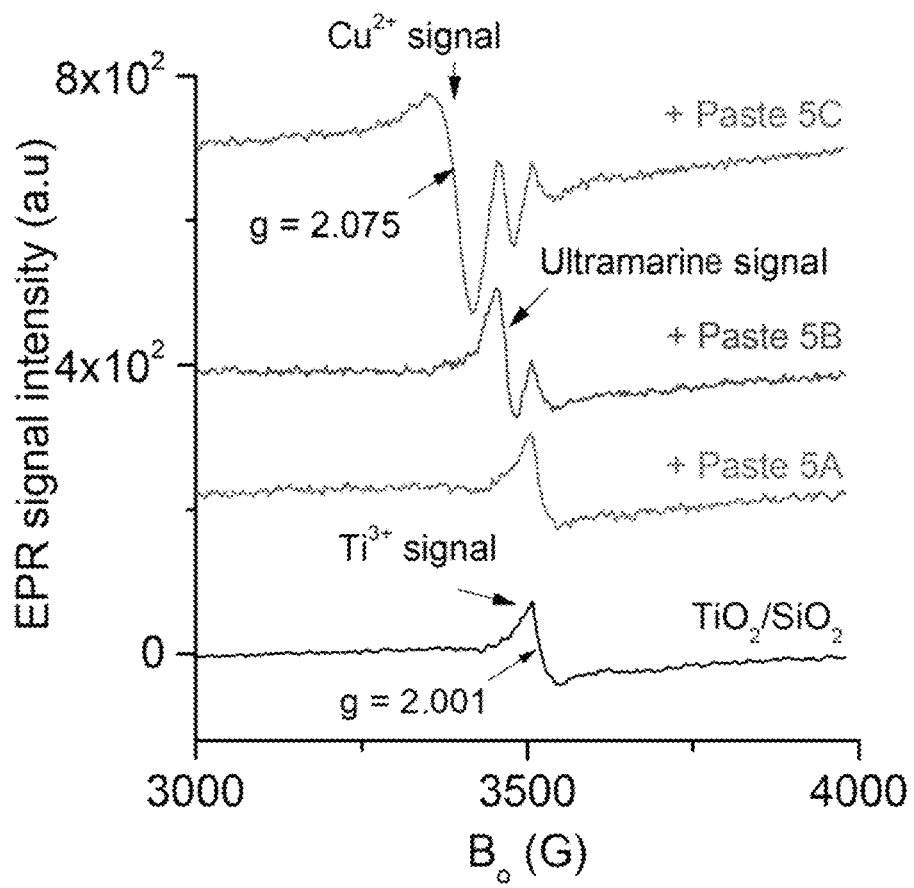
Fig. 13: ESR spectra of various paste samples (50 mg each) mixed with 20 mg of $TiO_2/SiO_2$ measured at 20°C. The samples were produced by mixing the individual pastes with solid $TiO_2/SiO_2$.

Fig. 14

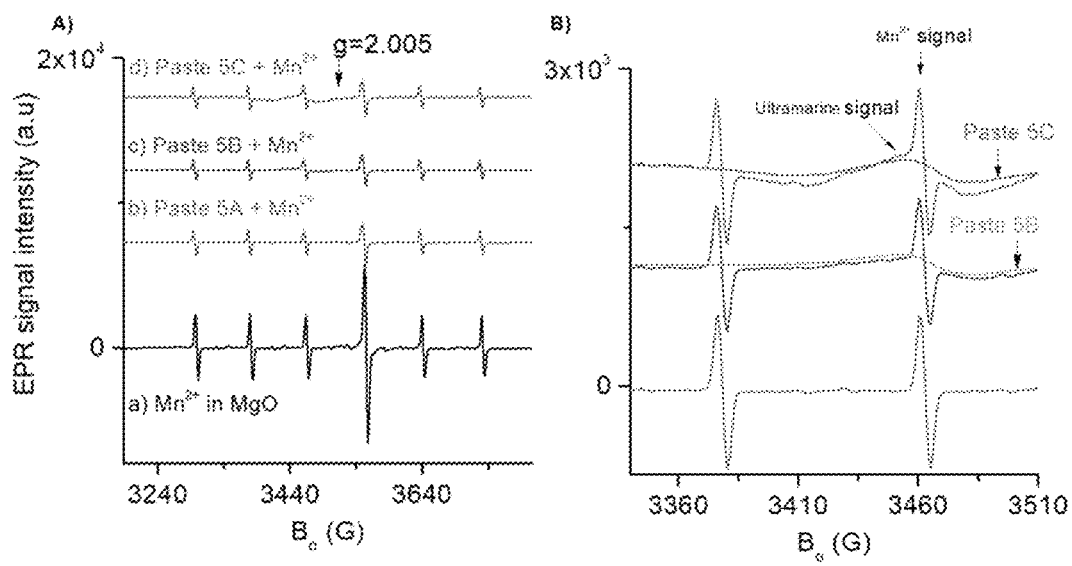

Fig. 14: ESR spectra of various paste samples (40 mg each) mixed with 10 mg of MgO having a Mn(II) contaminant (Mn in MgO < 1%) measured at 20°C. A) ESR signal of the isolated $Mn^{2+}$ ion in the MgO matrix; B) ESR spectra of (A), but with different range of X and Y axes in order to show the slightly masked EPR signal of ultramarine (for comparison, the ESR spectra of paste C and B were incorporated into this figure)

UNIQUE IDENTIFICATION AND AUTHENTICATION OF PRODUCTS

CROSS-REFERENCE TO RELATED APPLICATIONS

The present application is the national stage of international application PCT/EP2020/065502, filed on Jun. 4, 2020, and claims the benefit of the filing date of U.S. Prov. Appl. No. 62/856,795, filed on Jun. 4, 2019.

FIELD OF THE INVENTION

The invention relates to methods of unambiguous identification and authentication of products and to unambiguously identifiable and authenticatable products. The method thus provides an individualizable "femto tag" for femto ledgers and forms an important interface for what are known as "Internet of Things (IOT) applications".

BACKGROUND OF THE INVENTION

Forgeries and pirate copies of high-value products cause enormous economic damage year-on-year. In the case of medicaments, food and drink products and supplier and replacement parts in safety-critical fields such as aviation and the automotive industry, forgeries can also constitute a high risk to life and limb for many humans.

Owing to the manufacture of authentic copies of a product, it is frequently difficult, if not even impossible, to distinguish original products and copies from one another. Especially in the case of plastics or coatings, it is not possible or viable to introduce a serial number or another kind of information that permits product identification into the material of the product itself.

According to the prior art, for protection from copies or forgeries, as well as the known safety labels in the form of label sets, labels are used in the automotive sector for example that are mounted on the products and have various obvious and concealed safety features that are written into the information field with a high-resolution laser for example (DE 20 2007 017 753 U1). There also exist holograms (DE 10 030 629 A1), lithograms with data carrier fields, barcodes and matrix codes which are mounted on products and which can show origin-specific information directly on the product at mutually independent information levels. The disadvantage of these known protection mechanisms is that these are manufactured with a high level of technical complexity and at high cost and have to be mounted on the products—generally in a clearly visible manner. US 2006/0054825 A1 discloses a method of identifying and authenticating different objects or substances, wherein this method utilizes a data processing system coupled to means of spectrophotometry. It is a particular feature of the method that it comprises two phases: during an initial phase a multitude of chemical markers is selected, then a combination of markings is assigned to and introduced into each of the objects or substances, an authentication code is created, the authentication code is stored and an identification code is assigned to the object or substance and this code too is stored, and then an assignment between the identification code and the authentication code is established. There follows an identification and authentication phase comprising theoretical identification of the object or substance by readout of the identification code associated with the object or substance, the spectrophotometric analysis of the object or substance and the ascertaining of the authentication code of the object or substance, the authentication of the object or substance if the theoretical identification code corresponds to the authentication code and, finally, the issuing of an approval signal if an agreement has been established, or an alarm signal if there is no agreement between authentication code and identification code.

DE 44 45 004 A1 discloses a composition for delocalized labelling of articles, and the production and use thereof. The composition enables labelling of articles that makes it difficult to forge or improperly use or utilize these articles. It is characterized in that it contains chemical elements having a $K\alpha$ line from 3.69 keV to 76.315 keV in defined distributions, where the physical properties of this substance or its elemental and/or quantitative composition serves as delocalized information not apparent to the naked eye.

DE 10 2008 060 675 A1 describes a method of unambiguous identification and authentication of a product for protection from copies by means of use of markers, wherein a pulverulent marker is incorporated in the material of the product to be protected, which marker comprises an inert carrier and chemical elements in a previously fixed element code composed of a number of chemical elements and a previously defined encoding sequence with a defined arrangement of the chemical elements and fixed relative concentrations of the chemical elements. The carrier and chemical elements here are inextricably associated with one another, where the method comprises the steps of: (i) determining the chemical elements and their contents in the labelled material, (ii) comparing the values determined in step (i) with the previously fixed element code and the previously defined encoding sequence.

US 2018/0335427 A1 describes the use of markers (tags) for tracking and identification of pharmaceutical and nutritional products, which markers comprise at least one paramagnetic microparticle, wherein the at least one paramagnetic microparticle has a non-spherical form, a form factor of greater than one, and at least one unique and detectable chemical, in which the at least one unique and detectable chemical is connected to the at least one paramagnetic microparticle. The unique and detectable chemicals that are connected to the paramagnetic microparticles are analysed, for instance, by means of light absorption spectroscopy, Raman spectroscopy, surface plasmon resonance, fluorescence, electrochemical detection, ion chromatography and enzyme colour change chemistry.

Disadvantages of the methods described above include the high technical complexity in the production of the markers and the verification of a product as authentic product.

There is therefore a need for simple, inexpensive and effective methods of unambiguous identification and authentication of products in order to recognize forgeries or unauthorized copies.

SUMMARY OF THE INVENTION

The present invention is based on the surprising finding that electron resonance spectra (ESR spectra) can firstly be detected with a low level of complexity and, secondly, by a combination of paramagnetic phases, it is possible to specifically generate a multitude of distinct ESR spectra, called ESR fingerprint spectra, and add them in the form of a substance admixture to the product to be identified.

The present invention therefore proposes a product having an identification substance admixture that contains paramagnetic phases and has an ESR fingerprint spectrum that permits unambiguous identification of the product.

The paramagnetic phases of the identification substance admixture may be formed here by one or more phases selected from:
- paramagnetic centres, preferably S radicals, preferably selected from ultramarine,
- collectively ordering states selected from ferro-, ferri- and/or antiferromagnetic states, preferably selected from iron-oxygen compounds, more preferably magnetite or a material having Fe—O phases,
- a polymer having a paramagnetic centre, preferably isolated radicals,
- molecular paramagnets, and
- paramagnetic phases of mineral substances and/or salts, especially paramagnetic phases of $Al_2O_3$, $SiO_2$, naturally or artificially doped diamond or $ZrO_2$.

In one embodiment the phase is selected from copper(II) sulfate, manganese(II) chloride, manganese(IV) oxide, zirconium(IV) oxide, lactose monohydrate, titanium dioxide, homo- and copolymers, especially (meth)acrylate copolymers such as commercially available Eudragit® E, L, RL, FL 30 D from Evonik Industries AG or polylactide-co-glycolide as available commercially for example under the trade name Resomer® from Evonik Industries AG, natural ultramarine blue, D(−)-mannitol, diamond powder, magnesium oxide, ink black, D(+)-Trehalose, microcrystalline cellulose such as commercially available Avicel PH-101, proteins, especially fermented and/or recombinant proteins, such as triple-helical collagen, and mixtures thereof. In one embodiment these phases, especially before the ESR fingerprint spectrum is recorded, are activated by energy input, especially by x-ray irradiation.

In one embodiment the phases are a mixture of lactose monohydrate, MCC, natural ultramarine blue, diamond powder, copper(II) sulfate and magnesium oxide. In one embodiment the phases are a mixture of natural ultramarine blue, diamond powder, copper(II) sulfate and magnesium oxide, preferably in equivalent masses. In one embodiment a mixture of natural ultramarine blue, diamond powder, copper(II) sulfate and magnesium oxide is diluted in equivalent masses with lactose monohydrate and MCC in a weight ratio of $2/3:1/3$ to $1/8:7/8$, with lactose monohydrate and MCC likewise being used in equivalent masses to one another. In one embodiment the mixture, especially before the ESR fingerprint spectrum is recorded, is activated by energy input, especially by x-ray irradiation.

In one embodiment the phases are included at 0.0005 to 50 wt %, preferably 0.001 to 20 wt %, more preferably at 0.01 to 10 wt % or 0.01 to 1 wt %, based on the total weight of the sample under analysis. In one embodiment the phases are included at 0.0005 to 0.1 wt %, based on the total weight of the sample under analysis.

The materials mentioned preferably not only have the desired magnetic properties but are also non-toxic and suitable for consumption, i.e. are also suitable for use in medicaments and foods. The paramagnetic phases of the identification substance admixture may have been produced by methods including coating, admixing, doping, sputtering, chemical free radical generation, irradiation, in particular x-ray radiation, and/or by printing methods. The printing methods may include relief printing, intaglio printing, porous printing, screen printing, planographic printing such as offset printing, digital printing, siderography, screenprinting, electric photography (laser printing), powder printing methods, such as Xerox and electrospray, electrospinning, precipitation, paper moulding or layering methods, for instance screenprinting, or direct imaging. Suitable raw materials and media for the purpose are, for example, pastes, inks, stains, gases and vapours, lacquers, stencils, powders, solutions, melts, glasses, and physically active or chemically reactive forms thereof.

For decoding of the information encoded in the ESR spectrum, it is possible here to evaluate resonance frequencies, line form, intensity, signal coupling and/or spatial variation in the ESR fingerprint spectrum.

The ESR fingerprint spectrum of the identification substance admixture is preferably mechanically and/or thermally stable. In this way, product identification is assured even after a mechanically and/or thermally demanding transport pathway. Alternatively, for example, however, a thermally sensitive ESR spectrum can serve to register broken cooling chains, for instance in the case of medicaments or food and drink products.

The product according to the invention may, for example, be a pharmaceutical or medicament, a food or drink product or a precursor or intermediate or regulated constituent thereof, for instance a package, blister pack, container, such as glass and polymer tubes, a syringe, ampoule or a reservoir for liquids.

The product according to the invention may also be a fabric, a textile or leather product, a coin, a banknote, security, document, certificate or a cheque card or chip card or a part thereof, such as seal or shells, or a precious or semiprecious stone, a medical product, an implant or transplant, or a replacement part or supplier part for an industrial product.

The ESR fingerprint spectrum may encode the product itself, a manufacturer, a site of manufacture, a time of manufacture and/or production-specific data, for instance intended end use, rights such as licences or geographical indications, authorizing institutions such as approval authorities or the like.

The identification substance admixture and the accompanying ESR spectrum may be chosen identically for each individual product or for product batches.

The invention also proposes a method of producing an unambiguously identifiable product, comprising the method step of applying to the product an identification substance admixture containing paramagnetic phases and having an ESR fingerprint spectrum that permits an unambiguous identification of the product.

The paramagnetic phases of the identification substance admixture may be produced here by processes including coating, admixing, doping, sputtering, chemical free radical generation and/or irradiation, in particular x-ray radiation, printing, embossing, melting, extrusion, pressing, granulating, spheronizing, spray-drying, additive manufacturing (3D printing), thermal transfer, hot embossing, laser methods, inkjet printing and holographic printing.

The invention also provides a method of product authentication, having the method steps of:
(a) applying or introducing an identification substance admixture containing paramagnetic phases to/into a product or identifying a product which contains an identification substance admixture containing paramagnetic phases, which identification substance admixture has an ESR fingerprint spectrum that permits unambiguous identification of the product,
(b) recording an ESR fingerprint spectrum of the product,
(c) generating and storing a digital representation of the ESR fingerprint spectrum,
(d) measuring the ESR spectrum of a product to be authenticated and generating a digital representation of the ESR spectrum measured, (e) verifying the product to be authenticated by comparing the digital representation of the measured ESR spectrum of the product to be authenticated with digital representations of stored ESR fingerprint spectra.

It may be the case here that the digital representation of an ESR fingerprint spectrum contains a hash value derived from the ESR fingerprint spectrum. For instance, information confidential information may be encoded in the ESR fingerprint spectrum information since the hash value does not permit determination of the original data encoded with reasonable computation power;

conversely, the verification thereof is readily possible with knowledge of the original data (one-way coding).

The digital representations of the ESR fingerprint spectrum assigned to a product may be stored in a blockchain network in a forgery- and manipulation-proof manner. It is possible here, for example, for a distinct non-fungible token in the blockchain network to be generated for every stored digital representation of an ESR fingerprint spectrum, such that every distinct ESR fingerprint spectrum can be assigned a distinct token in the blockchain network, by means of which, for example, transactions (sales, licensing) relating to the products represented by the ESR fingerprint spectra can be digitally imaged and executed.

Verification of the authenticity of a multitude of measured ESR spectra can advantageously be conducted in a common detection step, for example using zero-knowledge proofs which enables the authentication of a calculation (for example of a sum of many individual values) without needing to disclose the individual value itself. For instance, the authenticity of a multitude of products can be verified, for example, by a third party (authority, service provider) in one step without the third party gaining knowledge of the individual ESR fingerprint spectra and the information encoded therewith.

The method step of measuring the ESR spectrum of a product to be authenticated and the generation of a digital representation of the measured ESR spectrum can advantageously be executed with a mobile end device, preferably a smart phone, on which a computer program that measures an ESR spectrum of the product using the circuit components of the mobile end device (called software defined radio (SDR) circuits) is executed. It is possible here that the ESR spectrum of the product is measured using an additional permanent magnet or antennas or external switchable circuit components that are suitable for the purpose. Alternatively, the ESR spectrum can also be measured using the Earth's magnetic field.

The invention also proposes a method of verifying the authenticity of a product having an identification substance admixture that contains paramagnetic phases and has an ESR fingerprint spectrum that permits unambiguous identification of the product, having the method steps of recording an ESR spectrum of the product with a mobile end device, preferably a smartphone, on which a computer program that measures an ESR spectrum of the product using the circuit components of the mobile end device is executed, and comparing the recorded ESR spectrum of the product with stored ESR fingerprint spectra.

The present invention also proposes a device for authentication of a product having an identification substance admixture that contains paramagnetic phases and has an ESR fingerprint spectrum that permits unambiguous identification of the product, wherein the device has: a spectrometer unit set up to measure an ESR spectrum, a communication unit set up to access a database that stores digital representations of ESR fingerprint spectrum, and a data processing unit set up to create a digital representation of the measured ESR spectrum of the product to be authenticated and to compare it with the digital representations of ESR fingerprint spectra stored in the database.

The authentication device is preferably in the form of a mobile or stationary end device, for instance of a smartphone, on which a computer program that measures an ESR spectrum of the product using the circuit components of the mobile end device is executable.

The invention finally proposes a computer program product executable on an end device, preferably a smartphone, which, when executed on the end device, measures an ESR spectrum of a sample containing paramagnetic phases using the circuit components of the end device.

DESCRIPTION OF FIGURES

The invention is described in detail hereinafter by working examples with reference to the drawings. The figures show:

FIG. 10 ESR spectra of various extrudates containing ultramarine blue;

FIG. 12 ESR spectra of various pastes containing TEMPO;

FIG. 13 ESR spectra of various pastes containing $TiO_2$/$SiO_2$; and

FIG. 14 ESR spectra of various pastes containing doped MgO.

DETAILED DESCRIPTION OF THE INVENTION

The present invention is based on the surprising finding that ESR spectra are particularly suitable as identification markers for a great multitude of products since
(a) an ESR fingerprint spectrum is generated by admixtures to the product itself or identification in the product itself rather than attached or applied labels, barcodes or the like, which distinctly improves anti-forgery security and handling, where the detection sensitivity is so low as to permit detection on the femtomole range and thus it is possible to provide an environmentally and functionally unobjectionable marker, especially important in the food and pharmaceutical sectors. Surprisingly the sample can be thus identified even without laborious sample digestion, (b) an ESR fingerprint spectrum can be specifically added to the product by various suitable production and admixing methods and combinations of multiple methods and hence intended information can be encoded, (c) an ESR fingerprint spectrum generated by a combination of different production and/or admixing methods is copyable with very great difficulty without the knowledge of these methods (inside knowledge), which in turn improves anti-forgery security, and (d) an ESR spectrum for product authentication can be recorded with a comparatively low level of apparatus complexity and time demands.

Figure 1:
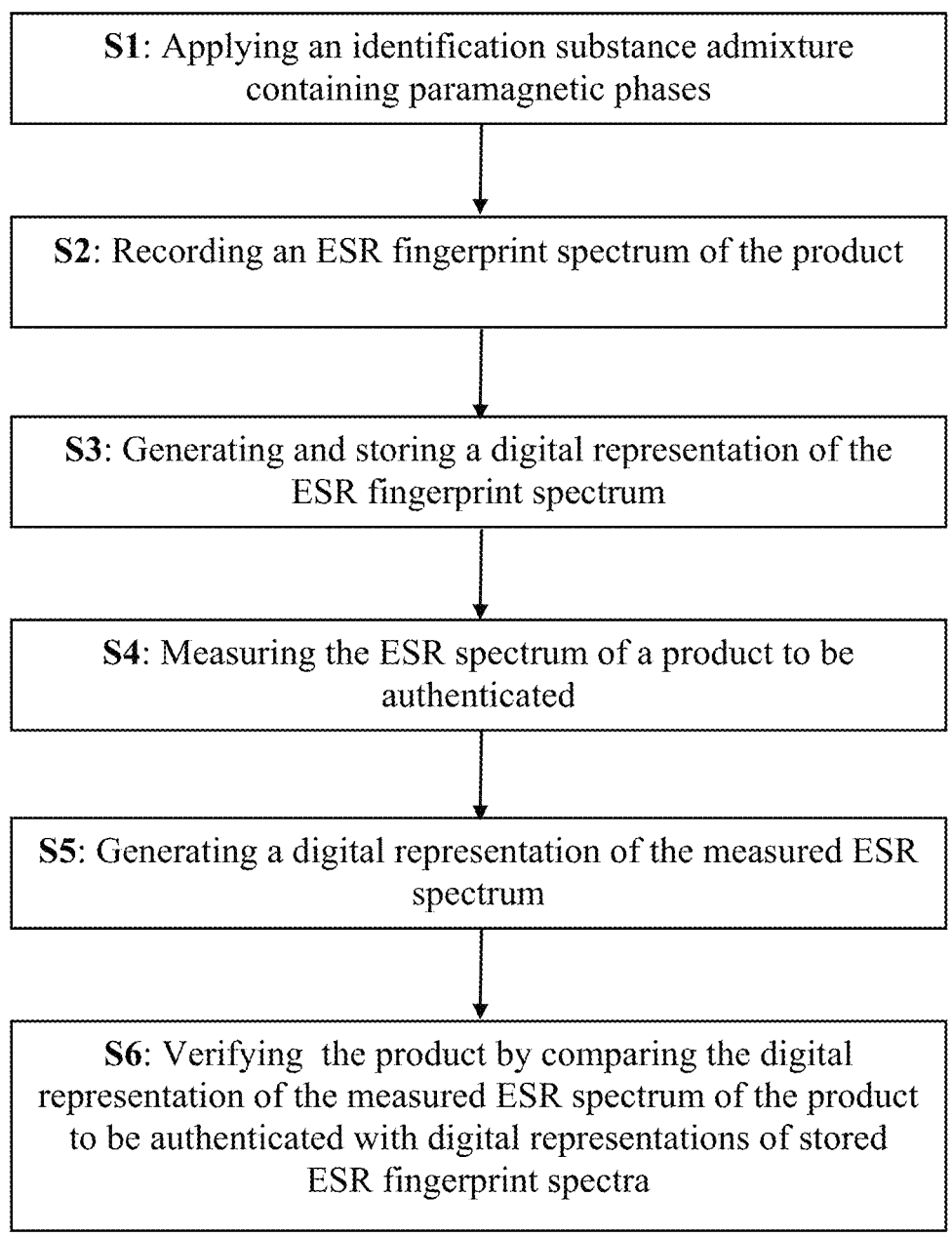
FIG. 1 a schematic flow diagram of a working example of a method according to the invention for product authentication.

The flow diagram in FIG. 1 shows a schematic of the individual method steps in a working example of the method according to the invention for unambiguous identification and authentication of a product.

The product may, for example, be a medicament, a food or drink product or a precursor or intermediate or regulated constituent thereof, for instance a package, blister pack, container, such as glass and polymer tubes, a syringe, ampoule or a reservoir for liquids. The product may alternatively be a fabric, a textile or leather product, a coin, a banknote, a security, a document, certificate or a cheque card or chip card or a part thereof, or a precious or semiprecious stone, a medical product, an implant or transplant, or a replacement part or supplier part for an industrial product.

In a first method step S1, by suitable methods, an identification substance admixture containing paramagnetic phases is applied/introduced to or into the product. These methods may include coating, admixing, doping, sputtering, chemical free radical generation, irradiation, in particular x-ray radiation, and/or by printing methods. The latter may include relief printing, intaglio printing, porous printing, screen printing, planographic printing such as offset printing, digital printing, siderography, screenprinting, electric photography (laser printing), powder printing methods, such as Xerox and electrospray, electrospinning, precipitation, paper moulding or layering methods, for instance screen-printing, or direct imaging. Suitable raw materials and media for the purpose are, for example, pastes, inks, stains, gases and vapours, lacquers, stencils, powders, solutions, melts, glasses, and physically active or chemically reactive forms thereof.

In method step S2, an ESR fingerprint spectrum of the product thus processed is recorded and, in the subsequent method step S3, converted by a fixed rule to a digital representation of the ESR fingerprint spectrum and then stored in a suitable storage medium such as a database or a distributed storage medium (distributed ledger), for instance a blockchain.

Method steps S1 to S3 typically take place under the control of the manufacturer or first distributor of the product in question.

The authentication or verification steps S4-S6 may be conducted as often as desired, for example by intermediate traders, customs authorities, final purchasers, users, customers, etc. In method step S4, the ESR spectrum of a product of the invention to be authenticated is measured and—when it is an original product—the ESR fingerprint spectrum of the identification substance admixture is detected. The ESR spectrum measured is digitalized by the fixed rule in method step S5 and then, in step S6, compared to the digital representation of stored ESR fingerprint spectra from the manufacturer/supplier in order thus to verify the authenticity of the product of the invention.

The invention can be viably utilized, for example, by pharmaceutical companies, producers, suppliers and experts along the value creation chain up to the final customer, for example patient or collector or final possessor.

The sections which follow elucidate various aspects of the invention in detail.

ESR Spectra

Systems with itinerant magnetism are known, where band electrons show spontaneous magnetic order. These are distinguished from those systems wherein the magnetic order is caused by localized electron spins. The latter are important in chemically complexed atoms, especially almost all coloured minerals, often as technical fillers and pigments or rare earths. Other important paramagnetic centres are insulators, such as synthetic and natural polymers and organic dyes, such as quinoids, anthocyans and polyphenols.

But the magnetic moment of localized electron spins is also increasingly affected by spin-orbit coupling effects in main and transition groups with increasing atomic number of the chemical element which is the atomic trunk corresponding to the localized electron spin. The material scientist is thus also aware of micro- and macroscopic spin-lattice systems up to and including metallic conductor bodies.

If the systems mentioned, viz. ionic-atomic, chemical complexes, insulator radicals such as polymers, minerally inerted or naturally mineral, semimetallic or metallic systems, are irradiated with microwaves, what are obtained in the most general sense are different steady-state or dynamic electron spin resonance or ESR spectra.

In principle, only systems having unpaired electrons are amenable to ESR spectroscopy, for example free-radical systems, paramagnetic transition metals, strip magnets and semiconductors. The paper by Angelika Brückner in *Chem. Ing. Tech.* 2014, 86, 11, p. 1871-1882, sets out that, according to the system, the resonant electron spin may be subject to complex interactions, for example between electron spin and nuclear spin, and/or is influenced by the three-dimensional symmetry. In measurement on systems composed of multiple superposed components, this causes complex ESR spectra that are often not easy to interpret. Although this demonstrates the high potential of the spectroscopic method for the study of unpaired electron systems, it can be seen at the same time that a combination of different systems cannot easily be assigned to a linear or easily calculated combination of ESR spectra.

If, for example, a given substance is monitored on its pathway through the human or animal organism, it is possible by detecting the site, identity and change in the ESR spectrum with time to draw conclusions as to the physical and/or chemical transformation of the aggregate or the substance, for example during their dissolution in the digestion process or in other metabolization processes.

Dorfman, *J. Exp. Theor. Phys.* 48 (1965), 715, assesses how macroscopic magnetic observables in such systems depend fundamentally on the grain size. Overall, in materials of relevance here, especially the medical-technical formulations, the behaviour of spin system, the "probe" of the overall aggregate that gives the moment, and legalistic-regulatory employability can be difficult to predict.

The intensity of the ESR signal, equivalent to the integral of the absorption signal, is directly proportional to the spontaneous magnetization $M_s$ of the sample, as set out in the paper by B. Heinrich and J. F. Cochran in *Advances in Physics* 42 (1993), 523. The line width of the ESR signal follows a dependence in the form of $$\Delta H \sim K_1/M_s$$

where $K_1$ is the magnetocrystalline anisotropy constant; cf. Ya. G. Dorfman, *J. Exp. Theor. Phys.* 48 (1965), 715.

Magnetic shape anisotropy also has a significant effect on the shape and position of the ESR signal. Since the magnetocrystalline constants of anisotropy of the known ferro- or ferrimagnetic materials are in the region of 103-106 J/m³, accordingly, an ESR line width $$\Delta H \sim (10^2 \ldots 10^4) Oe$$

is observed. V. K. Sharma and F. Waldner in *J. Appl. Phys.* 48 (1977), 4298, observed the line width $\Delta H$ in ferrimagnetic $Fe_3O_4$ powder of ~1000 Oe at room temperature. It should be noted that the magnetocrystalline constant of anisotropy of magnetite is about $3*10^4$ J/m³.

It is also known that, in particles at or below a critical size, thermal fluctuations are dominant over magnetocrystalline anisotropy above a critical temperature, also called blocking temperature, and hence such particles show superparamagnetic behaviour. Below the blocking temperature, by contrast, the particles have ferro- or ferrimagnetic behaviour. The critical size of the particles is determined by magnetocrystalline anisotropy. In magnetite, the critical particle size is about 14 nm; cf. G. Vallejo-Fernandez et al., *J. Phys. D: Appl. Phys.* 46 (2013), 312001. Magnetite nanoparticles having particle sizes at or below 14 nm can have relatively narrow ESR lines that are characteristic of paramagnetic and superparamagnetic particles, discussed in the paper by J. Salado et al., *J. Non-Crystalline Solids* 354 (2008), 5207, and in R. Berger, *J. Magn. Magn. Mater.* 234 (2001), 535. A particular form of such measurements is the detection of paramagnetic influences on imaging nuclear spin tomography, but their measurement is based on much weaker nuclear spin interactions.

FIG. 1a shows, by way of example, ESR spectra on various mixtures of magnetite $Fe_3O_4$ powder (MAG) and ultramarine blue (U B).

At a weight-based mixing ratio of UB:MAG=30:1, the ESR signal of the $S_3$ radical at g=2.026 is still readily apparent. It can be concluded from this that not yet all $S_3$ radicals of the UB have entered into strong magnetic dipole interactions with MAG. But even in the case of an elevated MAG content, corresponding to a mixing ratio by weight of UB:MAG=30:3, a distinct, broad ESR signal was obtained at g=2.307 owing to the ferrimagnetic MAG particles. The signal of the $S_3$ radicals, by contrast, was barely still apparent owing to the strong magnetic interaction between MAG and $S_3$ radical. In the case of a proportion by weight of MAG increased to a ratio of UB:MAG=30:4, this effect was further enhanced.

FIG. 1b shows the second derivative of these line forms with respect to the external magnetic field $H_{appl}$ employed for the spectroscopy. The twice-differentiated line forms showed the radical signal even more clearly here, especially at the UB:MAG ratio=30:4.

The influence of the magnetic interactions between MAG and UB that rises with the MAG content is perceptible in the respective peak-to-peak distance in the second-derivative line form with respect to the magnetic field.

Specific Generation of Characteristic ESR Spectra

One aspect of the present invention relates to the selective generation of particular characteristic properties of an ESR spectrum, for instance a resonance frequency or the line width, which properties can then be used for encoding of information (product characterization, site of manufacture, time of manufacture, intended use, rights etc.).

The invention comprises various combinations of algorithms, data architecture and known or future recording and tracking systems. The identification substance admixture can be applied over the entire production chain and all the production stages.

Surprisingly, the necessary properties of the specific stable atomic magnetism with a sufficiently large magnetic moment are within the range of the necessary physical resolution and sensitivity and are not altered by customary production conditions and could be employed and processed from the raw material up to the downstream transport and distribution in the value creation chain. Very surprisingly, the suitable components of the identification substance admixtures according to the invention (for example dopants) for most applications are to be found in the lists of inactive medicament constituents and of the regulated environmentally friendly pigments and functional matrix and coating materials for many industries, for instance polymeric minerals such as silicates or salts and oxides having small lattice anomalies and impurities.

The identification substance admixture may be a paramagnetic coating, or paramagnetic mineral, vitreous, paramagnetic molecular or paramagnetic ionic salt-type filler constituents in a polymer matrix or binder matrix and a phase in which paramagnetic centres can be generated successively, for example by ionizing radiation or chemical reactions, for example by layer-by-layer process construction. A readout magnetic field aligns the electronic paramagnetic centres by means of a variable or stable magnetic field that penetrates the body and generates the energy levels that can be repeatedly read out with the aid of the high-frequency unit of an ESR spectrometer. The resonance signals here may either be additive lines or they interact, according to the combination, characteristically and specifically with one another (coupling), which significantly extends the variety of types of labelling, the labelling variants.

Other physical magneton interactions can be generated by ionization, for instance by means of ionizing radiation. The publication "*Electron Spin Resonance Shift and Linewidth Broadening of Nitrogen-Vacancy Centers in Diamond as a Function of Electron Irradiation Dose*" by E. Kim et al. describes, for example, the controlled shift in an ESR resonance frequency and the increase in line width in the case of diamond samples by electron bombardment.

Individual fabrics can be provided effectively with an ESR fingerprint spectrum using polymer matrices. The ESR signals are well-randomized in order to obtain good bit coalescence. The signals do not change under the influence of industrial formulations, preparations or production processes extending as far as the melting of polymers and glasses. The layer-by-layer miscibility of the identification substance admixture containing paramagnetic phases enables virtually unlimited use on or in fabrics of polymer powders, leather, textile materials or coatings up to and including glass methods, extrusion or additive manufacturing methods (3D printing).

Measurement of the ESR Spectra

One advantage of the invention is that ESR spectra nowadays can be measured with a relatively low level of apparatus complexity and time demands. More particularly, the signal-to-noise ratio is much better than in the case of nuclear spin resonance measurements (NMR) known from medical diagnostics.

Figure 3:
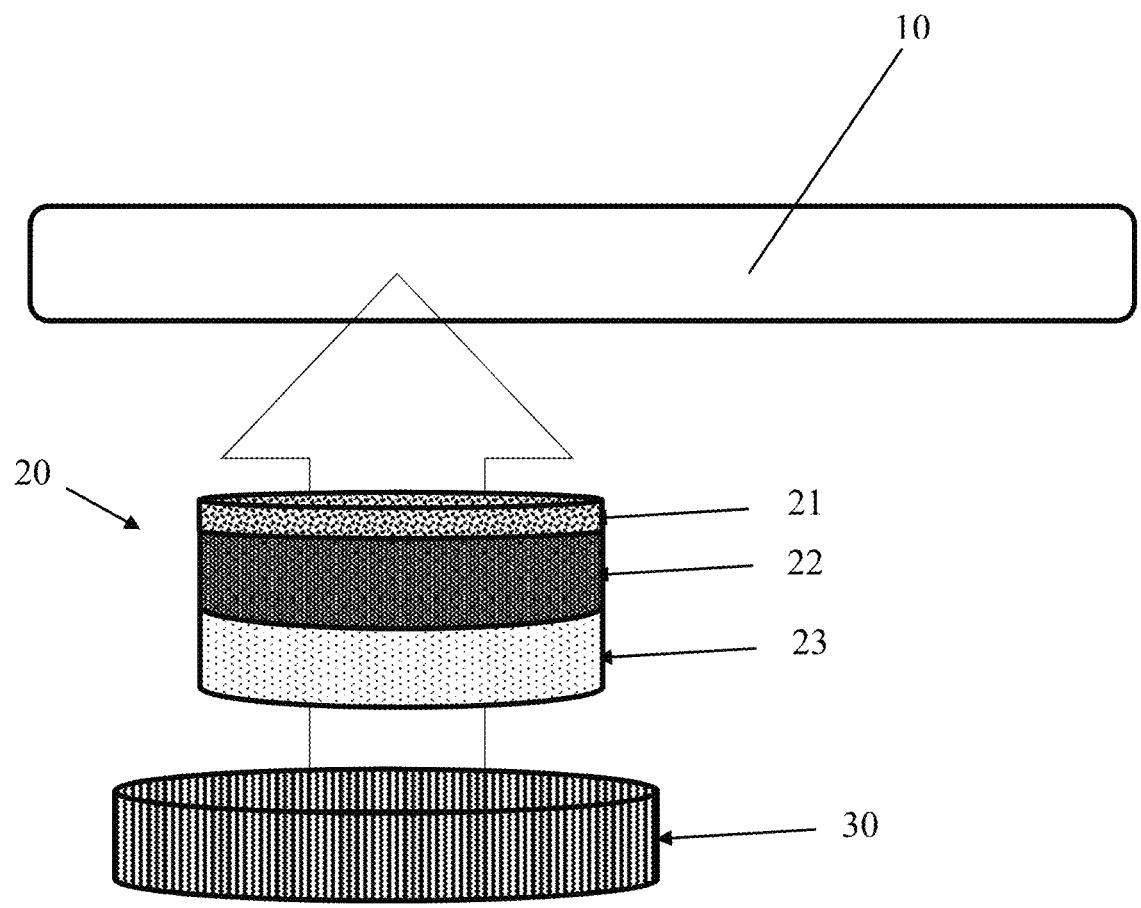
FIG. 3 a schematic illustration of a measurement arrangement for product authentication in a working example of the invention.
Figure 4:
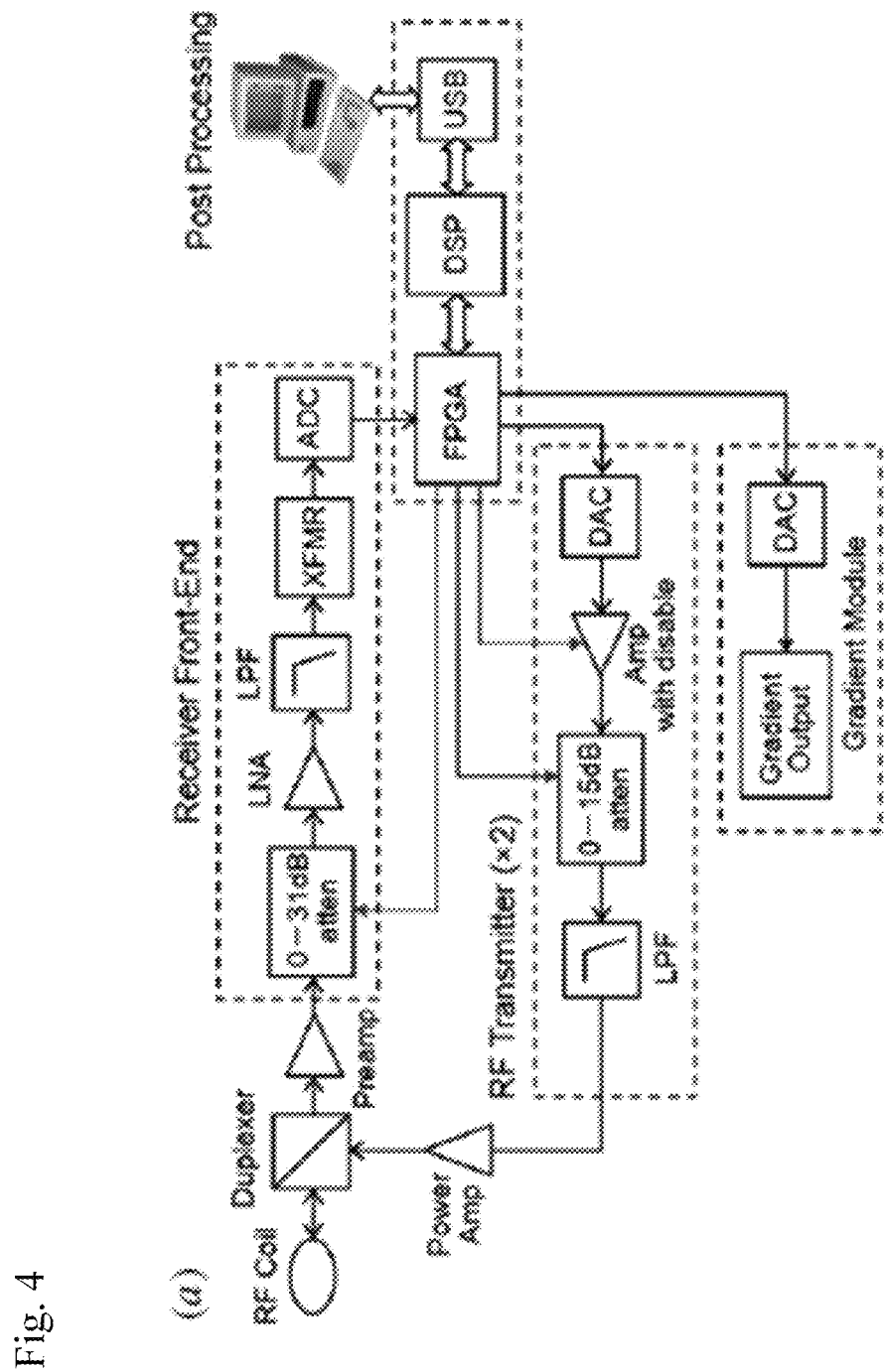
FIG. 4 the block diagram of a single-board circuit for measurement of magnetic resonance spectra.

The publication W. Tang and W. Wang, Meas. *Sci. Technol.* 22 (2011), 1-8 describes an NMR spectrometer accommodated on a single circuit board with a functionality defined by software ("single-board software defined radio (SDR) spectrometer"). The circuit arrangement presented in the article is shown in FIG. 3. The SDR-based architecture, implemented by the combination of a single field programmable gate array (FPGA) and a digital signal processor (DSP) with RF front-end circuits makes the spectrometer compact and reconfigurable. The DSP, which works as pulse programmer, communicates with a personal computer via a USB interface and controls the FPGA via a parallel port. The FPGA executes digital processing steps, such as a numerically controlled oscillator (NCO), digital downstream converter (DDC) and a gradient waveform generator. The NCO, with agile control of phase, frequency and amplitude, is part of a direct digital synthesiser which is used to generate an RF pulse. The DDC implements quadrature demodulation, multistage low-pass filtering and adjustment of amplification in order to generate a bandpass signal (receiver bandwidth from 3.9 kHz to 10 MHz). The gradient waveform generator is capable of emitting shaped gradient pulse waves and assists eddy current compensation. The spectrometer directly detects an NMR signal to 30 MHz in the baseband sweep and is suitable for low-field (<0.7 T) applications.

Since ESR signals have a much better signal-to-noise ratio than NMR signals, readout of ESR spectra is certainly possible with lower apparatus complexity, especially with a mobile end device such as a smartphone by installing a suitable software application exploiting the electronic components already present in the device ("software defined radio SDR").

FIG. 3 shows, in schematic view, a working example of such a device according to the invention for authentication of a product according to the invention. An SDR software application has been loaded onto a mobile end device 10 which, using a magnet or magnetizable component 30, detects an ESR spectrum of the identification substance admixture 20 of a product according to the invention. The identification substance admixture 20 may be a paramagnetic coating 21, or paramagnetic mineral, vitreous, paramagnetic molecular or paramagnetic ionic salt-type filler constituents in a polymer matrix or binder matrix 22 or a phase 23 in which paramagnetic centres are generated, for example by ionizing radiation or chemical reactions. The magnetic or magnetizable component 30 aligns the electronic-paramagnetic centres by a variable or stable magnetic field H that penetrates the body (vertical arrow) and generates the energy levels that can be read out repeatedly with the aid of the high-frequency unit of an ESR spectrometer or an SDR construction in the mobile end device 10. The resonance signals here may either be additive lines or they interact, according to the combination, characteristically and specifically with one another (coupling), which significantly extends the variety of types of labelling, the labelling variants. The component 30 generating magnetic field H may itself be accommodated in the end device 10 or be part of the environment of the measurement situation (e.g. Earth's magnetic field).

Field sweep and fixed field devices can nowadays be miniaturized readily. Pulse height (energy) is predefined here by the H field. It can be generated and altered in a power-saving manner by permanent magnets or by field coils. Pulse sequence parts can also be superimposed therein. It is also possible for separate high-frequency emitter and receiver coils to emit the pulses and receive FID components. The geometry of this high-frequency head can be miniaturized and is determined by the object or the paramagnetically labelled surface according to the invention.

The abovementioned publication by Tang and Wang gives a detailed description of such a measurement apparatus for NMR nuclear spins: methods that are comparable to ESR in physical/quantum-mechanical terms, but in which spin-magnetic moments that are a number of orders of magnitude lower are measured.

The necessary analogue-digital converters and the power driver and the entire high-frequency electronic system are kept at a particularly low noise level since direct signal synthesizer architecture is used, in that a "single field programmable gate array" (FPGA) chip constitutes a programmable "software defined radio" (SDR) in the immediate proximity of the multiplexer of the small high-frequency coil. There are thus virtually no noise components resulting from analogue signal mixing and filtering, which are conducted by digital mathematics.

However, the actual surprise and revolution in the smartphone sector is that analogue-digital converters and even FPGA chips, for example the ICE5LP4K chip in the iPhone 7, with the broadest possible programming latitude, enable for the emulation of an SDR in the system according to the invention with database access and global connectivity, in real time or with connection to networks. Even now, in these field devices, a multitude of assemblies is available to digitally record the necessary pulses, direct current control and HF-FID acquisition, to filter them by mathematical-digital means and to process them.

This means that, even before specific hardware adaptation, for instance by means of specific "ASIC" components (custom-designed chips), the SDR philosophy of modern smartphones is capable of using existing drivers and the "DSP" (digital signal processing) chips to permit the programmable ESR reading device for authentication according to the invention with a minimum of periphery (e.g. permanent magnet, shielding, high-frequency coil, field coil, power driver) by installation of apps (use programs).

Blockchain Networks

In the same way in which the Internet has revolutionized the publication, storage and dissemination of information, blockchain technology is in the process of revolutionizing the storage and transfer of values such as money, company shares, etc. Blockchain networks consist of a multitude of mutually connected network nodes, the common status of which is updated in a decentralized manner by means of a consensus protocol and stored in a chain of mutually catenated blocks ("blockchain") in the form of cryptographic codes. The consensus protocol that determines the content of the blocks, as in the case of bitcoin, may be based on what is called a proof-of-work protocol, in which multiple "miners" compete to solve a cryptographic puzzle (generating hash values less than a determined threshold value), in order to generate the next block and win the associated prize (in 2019: 12.5 bitcoins). In order to take part in the next round of the competition, the network nodes first have to confirm the validity of the current block, which establishes consensus as to the status of the network. As an alternative to the proof-of-work protocol, there are also proof-of-stake protocols, in which consensus as to the status of the network is achieved not through the use of (power-consuming) computing power but through the depositing of value-bearing network tokens by means of a probabilistic method. In addition, there are mixed forms and closed (private) blockchain networks in which authorized network nodes determine the network status. Especially public blockchain networks based on the proof-of-work consensus protocol feature a high degree of manipulation security since amendment of past events would require recreation of the entire intermediate "history" of the blockchain by extremely computing-intensive reworking of the consensus mechanism. By virtue of the decentralized storage of the network status in a multitude of network nodes ("distributed ledger"), there is also high security against data loss; there is no single point of failure.

In a blockchain network, it is possible to represent and trade material goods (products, consignments, replacement parts, raw materials, medicaments and drug-free products) and immaterial goods such as information, sums of currency or business shares. By virtue of the common network status which is transparent to all, the risk of default by a contracting party ("counterparty risk") is reduced, the trust in the counterparty required for the execution of a transaction is reduced and is replaced by trust in the mathematical and game-theoretical consensual algorithm.

A wide variety of different types of such blockchain networks are now being used to track and to store information about goods in the case of physical changes of location (warehouse, sale, customer) or transactions (e.g. change of ownership), for example in a cooling chain. Ideally, seamless traceability of the individual provenance of a single unit, a package, of a parcel of packages back to the origin of the end product and even through its precursors, pastes, readymixes and raw material sources is possible.

The network can also be a safe storage site for product knowledge generated in secret—or stochastically for example—if these data are stored in encrypted form, for example in the form of hash values, in the blockchain. The authenticity of the data can be verified by comparison of the hash value stored with a timestamp in the blockchain with a hash value generated from the private, confidential data.

In order to compare the reality stored in the blockchain network with the physical reality of a manufactured or processed product, the product package to date has been a significant weak point. Smart tags such as RFIDs have to be attached to and removed from the individual product, require housing and securing mechanics. This problem is solved by the identification substance admixture according to the invention, containing paramagnetic phases, which has an unambiguously product-identifying ESR fingerprint spectrum that does not depend on a product package or the like. The fingerprint ESR can be specifically altered only with very great difficulty, similarly to the entry in the blockchain ledger. The invention thus constitutes an unambiguous and manipulation-proof ledger of products in the physical world, as counterpart of the distributed manipulation-proof ledger that blockchain networks provide.

Observation of Chemical Conversion Processes

The product according to the invention may be configured, for example, as a body for uptake in a human or animal organism.

The inventors have completely surprisingly hit on a further correlation. While an ESR spectrum has been regarded as being typical of the substance being irradiated at the present state of knowledge, it is possible, for example, to solve the technical problem of how systematically controlled and intended conversion processes on the substance, especially by combination of various systems, for instance in the form of mixtures, compounds or generally compositions composed of various macroscopic or microscopic phases, afford characteristic ESR spectra for the respective composition. Compositions composed of at least two materials have been found, in which at least one material outside the composition in its pure form would give characteristic ESR spectrum. But in the composition with at least one further material, precisely that ESR spectrum is surprisingly significantly attenuated or has completely disappeared. In this case, the body that has multiple phases and is taken up by the human or animal organism or is within the organism has at least two phases with a different electron spin resonance spectrum. At least one of the phases has itinerant or localized magnetism. ESR spectra of rare earths are found to be less well suppressed, and, according to the combination, the body shows attenuation of the ESR spectrum or superimposition of different ESR spectra.

It may be advantageous when at least one phase of the body according to the invention has purely paramagnetic centres, preferably S radicals, preferably selected from ultramarine. It may be particularly advantageous, rather than ultramarine, to select superparamagnetic particles, preferably comprising or consisting of magnetite or maghemite or pyrites or iron-containing compounds such as amethyst. In the case of such particles, a similar ESR signal is found. Preferably, at least one phase of the body according to the invention has at least a collectively ordering state that may be ferro-, ferri- and/or antiferromagnetic. More preferably, this phase includes iron-oxygen compounds. Most preferably, at least one phase is magnetite or a phase composed of the Fe—O system. The phases mentioned are especially substances that are harmless to the human or animal organism. In addition, such selected phases may be pronounced in the form of a tablet formulation. What are surprising are the orders of magnitude of the effect that attenuates or suppresses the ESR spectrum.

The phases can additionally be reworked in particle dispersions. It is again surprising that it is thus possible in a simple manner to provide a pharmaceutical formulation since specifically magnetite or a material having Fe—O phases is of very good compatibility with respect to the human organism and even in human medicine would be extremely safe to use. The body could thus likewise be used reliably in the gastrointestinal region because the body does not include any highly toxic substances or harmful free radicals.

In any spectroscopy, the better the signal-to-noise ratio of the system in question, the better the measurement results achieved, where the system in this case is the organism in question with the body according to the invention and the instrumentation for detection of the ESR spectrum. Human and animal organisms show by far predominantly diamagnetic behaviour in magnetic fields, and diamagnetic background barely disrupts even the much more sensitive nuclear spin tomography.

Thus, when the body according to the invention is used, only very low magnetic field strengths are required for the measurement of the ESR spectra.

In addition, it may be advantageous that, in the body according to the invention, at least one phase is encased by at least one further phase. More preferably, one phase as a thin film encases a further phase. Preferably, the thickness of the film and the phases may be selected such that the ESR spectrum of the inner, encased phase is fully concealed by the ESR spectrum of the outer, encasing phase.

If the passage of the body according to the invention through the human or animal organism is associated with the breakdown of the body, the ESR signal of the encased phase appears ever more strongly in a time-dependent manner with the breakdown of the encasing phase. This simple time dependence is a further advantageous property of the body.

If magnetite particles are selected in at least one phase of the body, the inventors are of the view, without being tied to a particular theory, that the ESR spectrum could be caused not just by intrinsic magnetic properties but also by dipole interactions between magnetite particles. The interactions are preferably influenced by the shape of the particles, for example sphere, needle, cube, and generally by the spatial distribution of the magnetite, for example film. These forms show different demagnetizing fields.

The more ferri- or ferromagnetic components the body according to the invention possesses, the more strongly the ESR signal is attenuated. In this context, absorption of the microwaves emitted in spectroscopy is suspected.

Also conceivable are bodies in which a ferromagnetic phase and a free-radical phase, for example an ultramarine phase, are present in spatial separation, preferably in the form of spatially separated agglomerates. This corresponds to a distinct ESR spectrum. If the body is then broken down, there is temporary mixing of the two phases, and, given a suitable ratio of one to the other phase, the ESR spectrum of one phase, preferably that of ultramarine, temporarily disappears entirely. Thus, the breakdown of the body in the organism can be assigned specifically to the breakdown process. It may also be advantageous when the body according to the invention has at least three phases, where one phase is preferably paramagnetic, preferably selected from (phen)CuCl$_2$. In this case, the ESR line shape is more complex, and time-resolved behaviour is obtained in the breakdown of the mixture of the phases, for example on breakdown of the body during the metabolic process in the organism, which is demonstrated by a time dependence of the ESR spectrum. Progressive breakdown can be documented.

Accordingly, preferably magnetic, paramagnetic and free-radical phases may be combined. If a body of such a composition is broken down in the organism, with the breakdown-related disappearance of the magnetic phase or the detachment thereof from the body, another, "final" ESR line shape appears, which is distinctly different from the ESR line shape of the undecomposed body according to the invention.

Such breakdown processes are advantageous in the case of non-therapeutic procedures, for example within the scope of personal, non-medically motivated questions of nutrition or nutrition habits.

However, the breakdown processes are also the target of medical implants, for example, in the functional coatings thereof and particularly oral administration forms of nutraceutical, dietetic or therapeutic formulations, for example capsules, tablets, films and granules and multiparticulate administration forms in food technology and, independently of that, medicament technologies. They can be designed very specifically via the choice of excipients used, for example of capsule shells, particle coatings and the medical technology materials used, and hence controlled via the formulation process. Preference is given here to using solubility, more preferably pH- and time-dependent solubility of such auxiliaries and excipients. In the case of medical-technical implants, it is particularly hydrolysis that leads to the desired absorption of matrices and coatings. Examples include the approved materials and polymers Eudragit® methacrylates and Resomer® polyesters, modified starches such as HMPC, HMPC-AS or polylactites and co-glycolites or co-caprolactone for surgical material, and absorbable medical technology coatings or implants. It is possible here for such insulator polymers, especially medical technology polymers, themselves to bear paramagnetic centres, as arise, for example, in irradiating sterilization by means of an electron beam or γ radiation. It is thus also preferable that the body according to the invention has at least one phase having at least one medical technology polymer having a paramagnetic centre, preferably isolated free radicals.

It is thus possible for the appearance of the final ESR line shape to be regarded as a fingerprint of the body during the breakdown in the organism. This is elucidated in detail in Example 2 and FIG. 6.

Since mixed phases are thus distinguishable from clean phases, and the breakdown of at least one phase of the body according to the invention is detectable, it is also possible to detect dosages, meaning mixtures of differently constructed bodies, in the organism.

What is thus likewise provided by working examples of the invention is the use of the body according to the invention that preferably has at least three phases for the monitoring of breakdown processes in the human or animal organism.

EXAMPLES

The invention is elucidated in detail hereinafter by examples.

In the context of the invention, the term "room temperature" is understood to mean an ambient temperature of about 20° C.

Example 1

Loose powder premixes permit simple alteration during the production process up to an unambiguous identification substance admixture for individual tablets or small parts, which is achievable only with difficulty by other methods, microelectronic components or physical labels.

The constituents of such a powder premix may be:
1) microcrystalline cellulose or HPMC
2) Vestamid or PVP
3) PEEK
4) Eudragit
5) PLA

| No. | Standard | Paramagnetic centre |
|---|---|---|
| 1 | Cu/Al$_2$O$_3$ | Single Cu(II) |
| 2 | Mn/MgO | Single Mn(II) |
| 3 | TiO$_2$ or ZrO$_2$ | F centre |
| 4 | C$_3$N$_4$ | Signal of conduction band electrons |
| 5 | ultramarine | S$_3^-$ |

The following variants are conceivable here:
a) all oxides mixed, diluted in auxiliary 1
b) oxide mixture without the pigments of the strongest two signals, diluted in auxiliary 1
c) compact of a (for example from IR compact press)
d) b, but diluted in auxiliary 2
e) auxiliary 3 irradiated (control)
f) auxiliary 4 irradiated (control)
g) auxiliary 5 irradiated (control)
h) b, diluted in auxiliary 3, 4 or 5 (according to success) and irradiated
i) b, diluted in auxiliary 3, 4 or 5 (according to success) and not irradiated
j) all oxides mixed in auxiliary 3, 4 or 5 (according to success), reference for h and i
k) further dilution in auxiliary 1 as a (so diluted that still just detectable, e.g. 1:100)

l) if auxiliary 3, 4 or 5 in irradiated form works, two of these mixed with two oxides in corresponding dilution m) water-moist paste of one of the above mixtures n) molten mixture (made available in cooled form with ultramarine)

In the case of use as laminate or extrusion, it is possible to take account of regulatory aspects with regard to maximum concentrations of particular substances.

Example 2: Inventive Body Comprising Ultramarine Blue and Magnetite

Magnetite $Fe_3O_4$ powder, abbreviated to "MAG" in the context of the invention, trade name "Cathay pure Black B2310", available from Cathay Industries, and ultramarine blue powder, abbreviated to "UB" or "ultramarine", trade name: "Kremer Pigment, Product No. 45000", were mixed using a mortar with the aid of a pestle in the weight ratios of MAG:UB=1:30, 3:30 and 4:30.

ESR spectra of the mixture thus obtained were recorded in the X band (9.5 GHz) at room temperature and a microwave energy of 6.3 mW, at a modulation frequency of 100 kHz and an amplitude of up to 5 Gauss.

In addition, thin layers containing MAG were applied in each case to different adhesive strips, with additional dilution of the concentration of the MAG with methyl cellulose, or UB, where each of these components had been provided beforehand in the form of a suspension in ethanol. ESR spectra of the layers thus obtained were recorded.

In order to make sure that UB and MAG have entered into intimate contact, such that there was sufficiently large interaction with the $S_3$ radical, the ESR spectra were first recorded on separate thin layers. Subsequently, the ESR spectrum was recorded in each case on the mutually bonded adhesive strips.

Figure 2A:
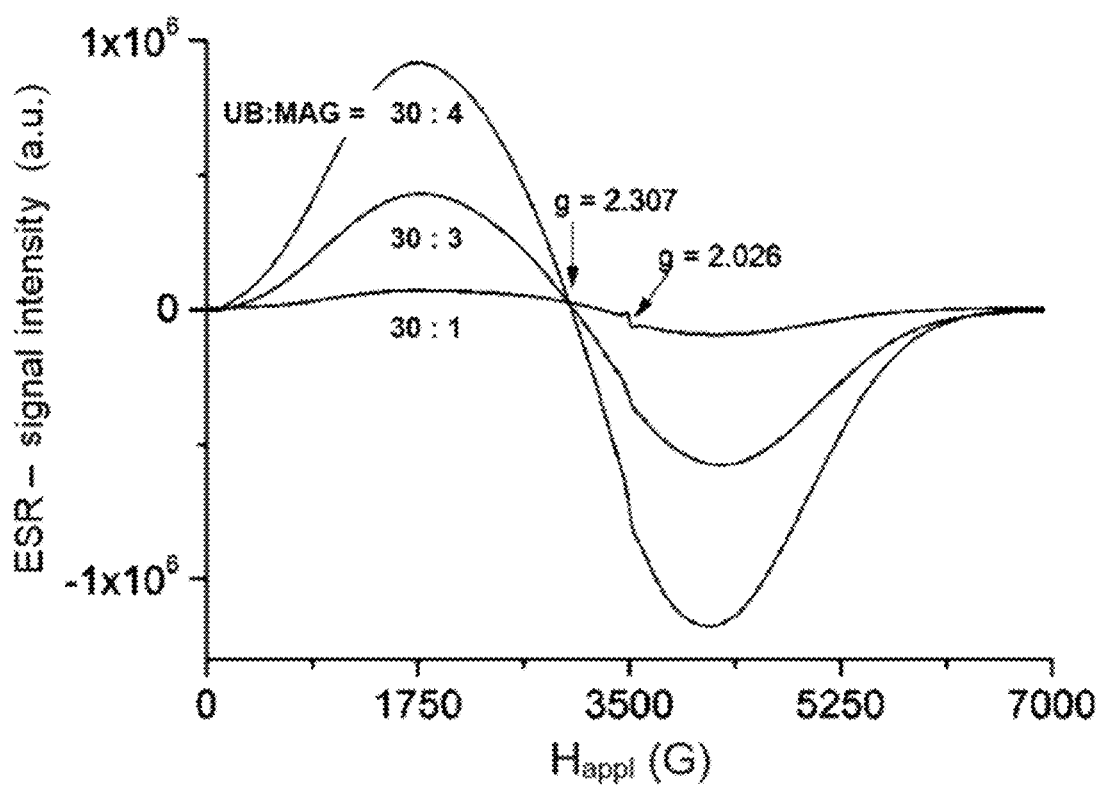
FIG. 2a ESR spectra on powder mixtures of UB and MAG in various weight ratios, recorded at room temperature.

FIG. 2a shows ESR spectra on various mixtures of MAG and UB.

At a weight-based mixing ratio of UB:MAG=30:1, the ESR signal of the $S_3$ radical at g=2.026 is still readily apparent. It can be concluded from this that not yet all $S_3$ radicals of the UB have entered into strong magnetic dipole interactions with MAG. But even in the case of an elevated MAG content, corresponding to a mixing ratio by weight of UB:MAG=30:3, a distinct, broad ESR signal was obtained at g=2.307 owing to the ferrimagnetic MAG particles. The signal of the $S_3$ radicals, by contrast, was barely still apparent owing to the strong magnetic interaction between MAG and $S_3$ radical. In the case of a proportion by weight of MAG increased to a ratio of UB:MAG=30:4, this effect was further enhanced.

Figure 2B:
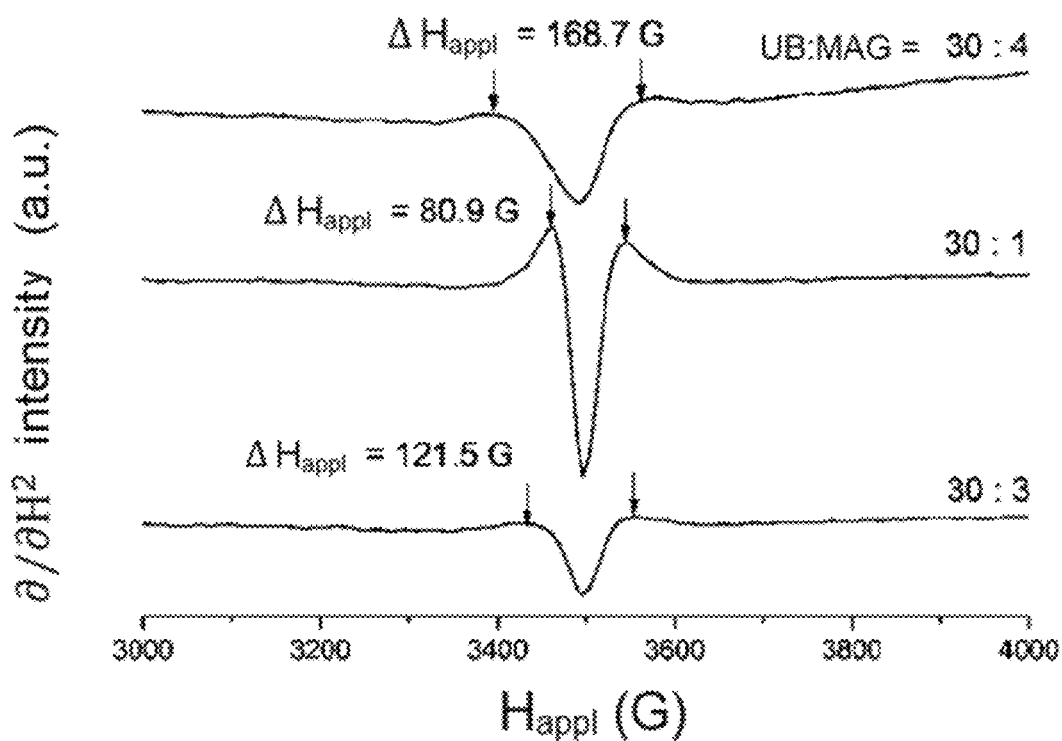
FIG. 2b the second derivatives of the ESR spectra from FIG. 2a with respect to $H_{appl}$.

The second derivative of these line forms with respect to the external magnetic field $H_{appl}$ employed for the spectroscopy was shown by the diagram in FIG. 2b. The twice-differentiated line forms showed the radical signal even more clearly here, especially at the UB:MAG ratio=30:4.

The influence of the magnetic interactions between MAG and UB that rises with the MAG content was perceptible in the respective peak-to-peak distance in the second-derivative line form with respect to the magnetic field.

Figure 5:
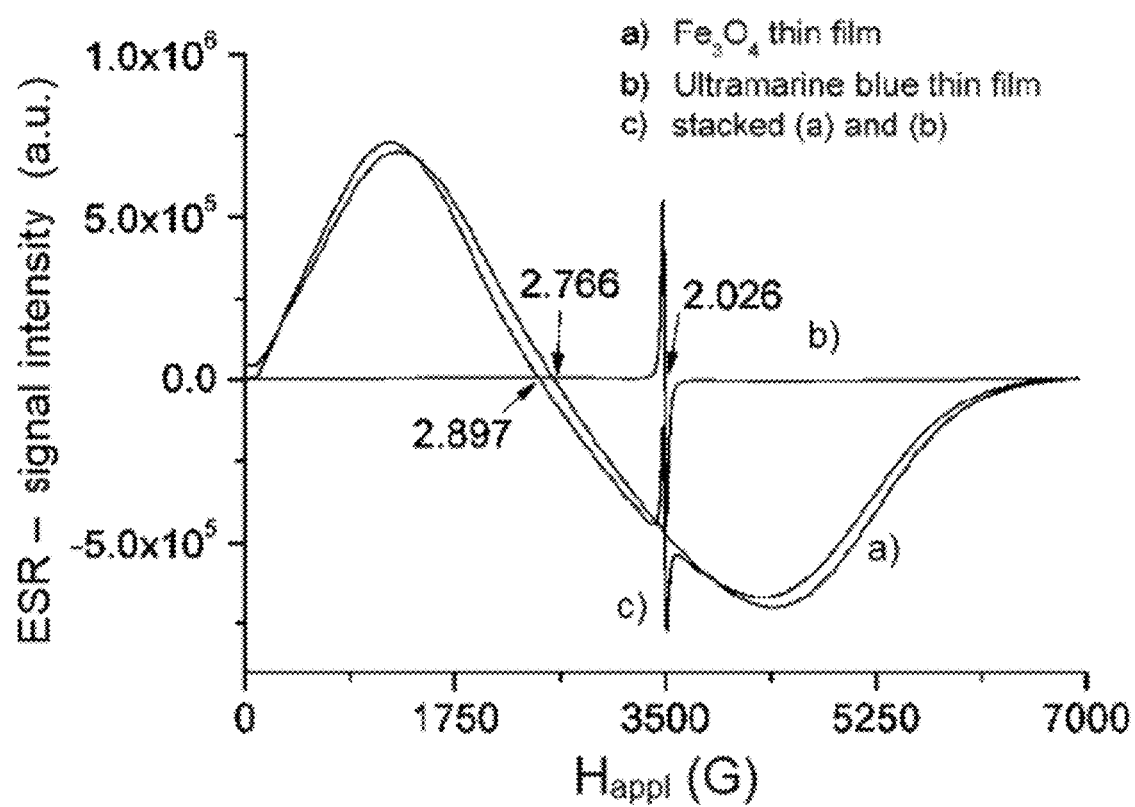
FIG. 5 ESR spectra of thin films containing layers of $Fe_3O_4$, ultramarine blue, MAG and UB.

FIG. 5 shows ESR spectra that were obtained on thin layers of UB and MAG on adhesive strips. As expected, the ESR signals of the layers comprising MAG and comprising UB corresponded to the ESR signals of the pure MAG and UB components.

If, however, an intimate bond was provided by the sticking of the adhesive strips onto one another, different ESR signals were obtained.

The intensity of the ESR signal caused by the $S_3$ radical was found to be attenuated, whereas the ESR signal of the MAG barely lost any intensity but had undergone a slight shift from a value of g=2.766 to g=2.897.

It is assumed that this effect was attributable to the magnetic dipole interaction between MAG and UB, which probably means that even the mechanical contacting of the thin layers onto the adhesive strip simultaneously affected the ESR signal of the $S_3$ radical and the ferromagnetic ESR signal. The ESR spectra just demonstrated show that, in mixtures of UB and MAG, a proportion of MAG of even about 10% by weight is sufficient to suppress the ESR signal of the $S_3$ radical below the detection limit. Even the contacting of thin layers containing both components attenuated this signal to about half the value.

If, by contrast, exclusively a paramagnetic component was mixed with UB, the $S_3$ radical ESR signal was obtained in virtually unchanged form, even when the proportion of the paramagnetic component was much higher than that of MAG.

Without being tied to a particular theory, the inventors suspect the cause of the shift in the ESR signal in FIG. 5 to lie in the magnetic state of the particles that causes self-demagnetization. The resulting internal field $H_{int}$ can be approximated by a simple relationship:

$$H_{int}=H_{appl}-N\,M,$$

where M is the magnetization, N is the demagnetization factor and $H_{appl}$ is the external magnetic field employed for the spectroscopy. The demagnetization depends on the geometry of the M-comprising particles or substance and the global form of the body that consists of such particles or substance. In the form of a layer, for example, that led to the spectrum in FIG. 5, a much stronger demagnetizing field is found when the outer magnetic field is applied at right angles to the layer surface than is brought about by spherical or cubic particles or bodies. N here can be assumed to be close to 1.

In the case of spherical or cubic particles or bodies that in particular are not in a layer arrangement, N can be set at ≈⅓. It is also suspected that the demagnetizing field causes the shift in the ESR spectra as a result of a change in magnetostatic interaction when the layers containing magnetite and ultramarine are stacked one on top of another than the abovementioned dipole interactions in the case that magnetite and ultramarine are mixed together.

Example 3: Body Comprising Phen(CuCl$_2$) and Ultramarine Blue

As Example 2, except that the mixture, rather than with MAG, was provided with paramagnetic dichloro(1,10-phenanthroline)$Cu^{II}$ (phen(CuCl$_2$)) complex and ultramarine blue in a weight ratio of 1:1.

While a considerable attenuation effect was observed in Example 2 because of the strong magnetic interaction between MAG and the $S_3^-$ radical anion of ultramarine blue, this interaction was absent between the paramagnetic component with $Cu^{II}$ ions ($d^9$, spin=½), namely the phen(CuCl$_2$) complex.

Figure 6:
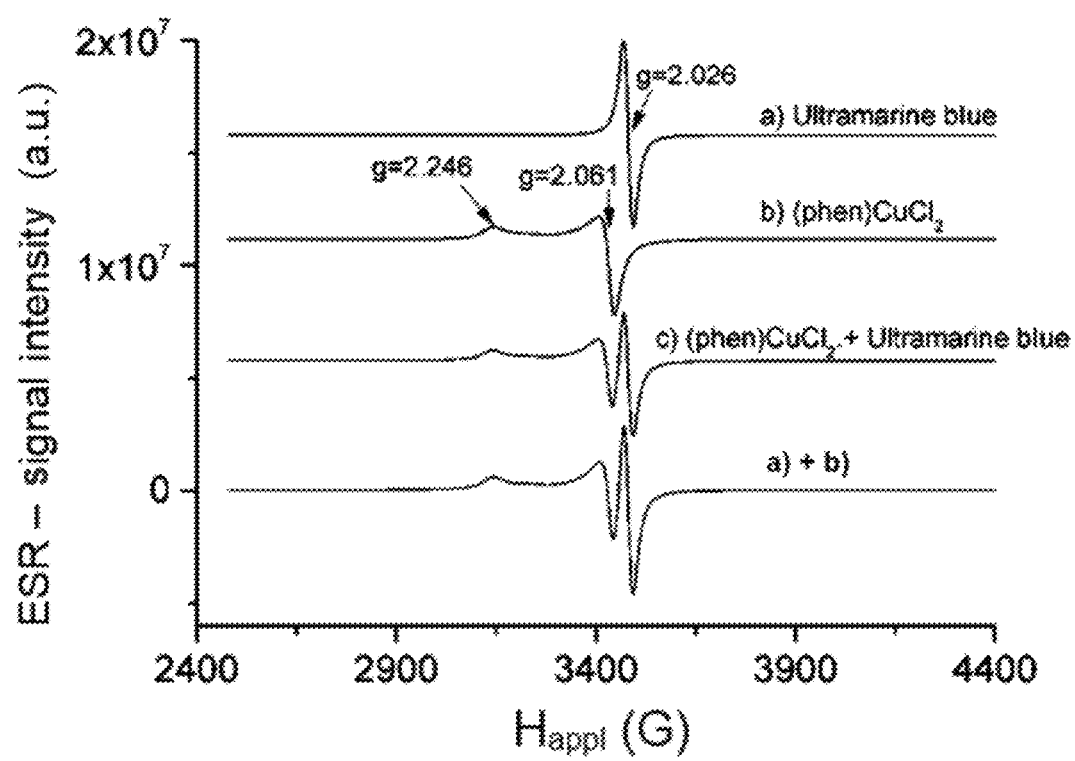
FIG. 6 ESR spectra of a) ultramarine blue (UB), b) phen($CuCl_2$), c) UB and phen($CuCl_2$) mixed in a weight ratio of 1:1.

The ESR spectrum of the paramagnetic phen(CuCl$_2$) complex showed the typical signals of $Cu^{II}$ at g=2.246 and g=2.061, shown in FIG. 6, line shape b). The mixture with UB gave the ESR spectrum as a superimposition of $Cu^{II}$ and the $S_3^-$ radical (FIG. 6, line shape c)). Line shape c) obviously corresponded in a very good approximation to the direct sum total of line shapes a) and b); see FIG. 6, line shape a)+b). This demonstrates a vanishing magnetic interaction between $Cu^{II}$ and $S_3^-$ of ultramarine blue.

Example 4: Inventive Body as Tablet Suspended in Water

Figure 9:
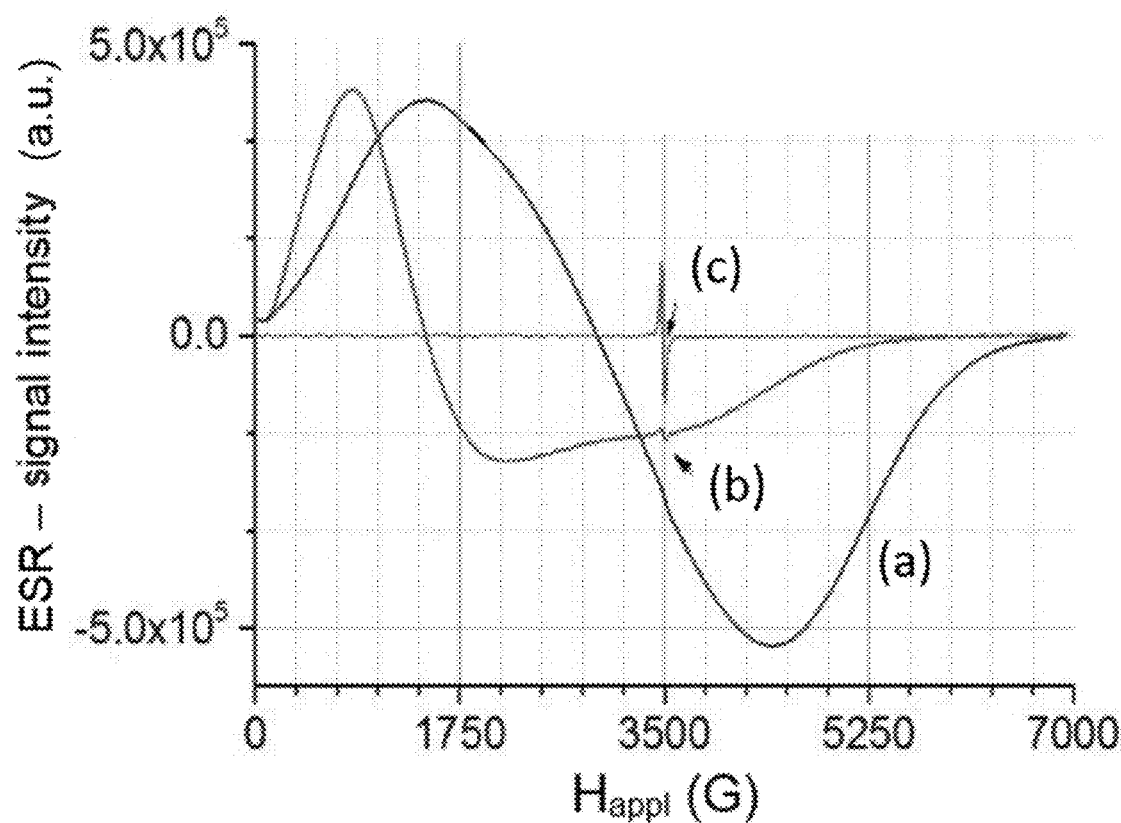
FIG. 9 ESR spectra of ultramarine and magnetite as tablet (a) and suspended tablet (b)

A mixture of 10 mg of $Fe_3O_4$, 10 mg of ultramarine blue and 130 mg of methyl cellulose was pressed to a tablet by subjecting the mixture to a pressure of 10 bar for 2 min. The tablet thus obtained was comminuted and suspended in water in a beaker. For the ESR measurements, samples of the suspension were introduced into a glass capillary after different times. Different ESR spectra were obtained as a function of time, which are shown in FIG. 9, specifically with line shape (a) the as yet unsuspended tablet and with line shape (b) the signal of the tablet after advanced suspension.

The apparent total intensity of the ESR signal demonstrates the altered content of suspended solids with time. The inventive monitoring of breakdown processes is thus also possible for simple dissolution of the body according to the invention. Line shape (c) in FIG. 9 shows the magnetite-free ESR signal for comparison.

Comparative Example: ESR Measurements on Pure Magnetite or Ultramarine

ESR spectra were recorded in the band at different temperatures on one solid sample each of magnetite, trade name "Cathey Pure Black B2310 (40969)", and one sample of ultramarine, trade name "Kremer Pigment (45000)".

Figure 7:
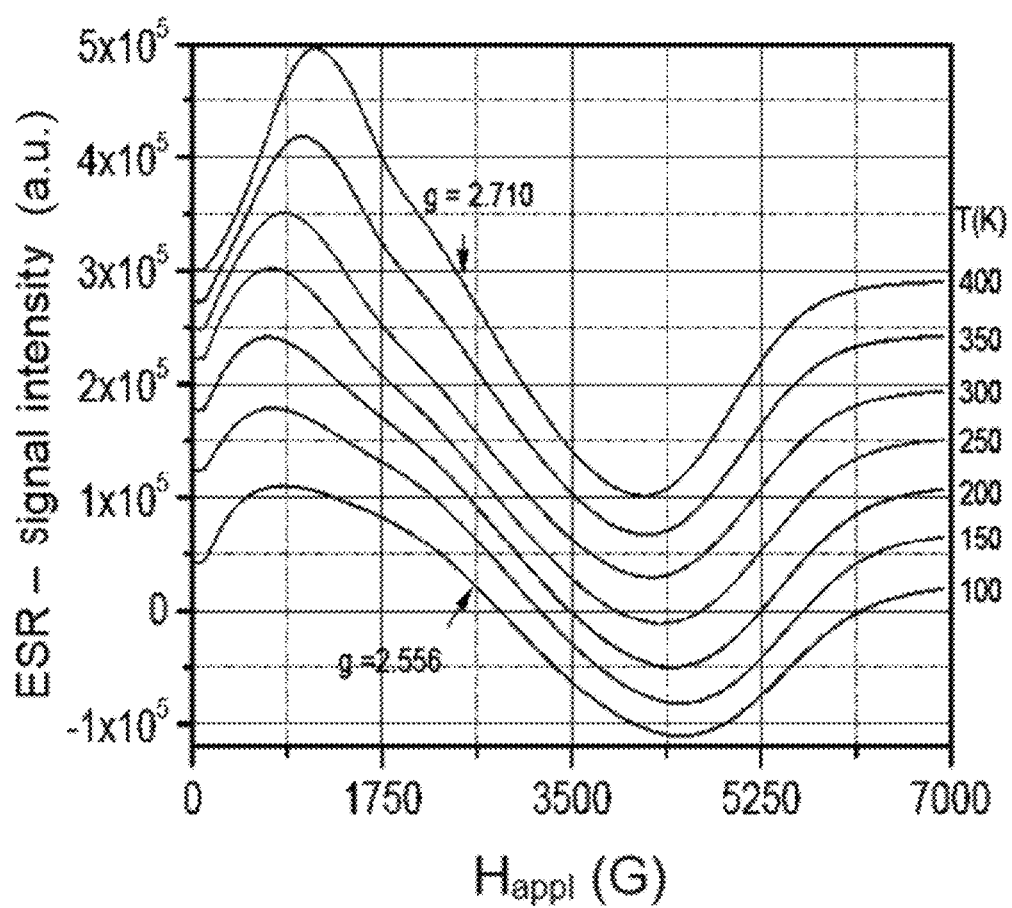
FIG. 7 ESR spectra of magnetite at various temperatures.

Pure magnetite showed the typical broad asymmetric singlet for ferromagnetic behaviour, the line shape of which changed reversibly with rising temperature, shown in FIG. 7. Such behaviour is probably attributable to the superimposition of ferromagnetic domains of different structure and/or orientation.

Figure 8:
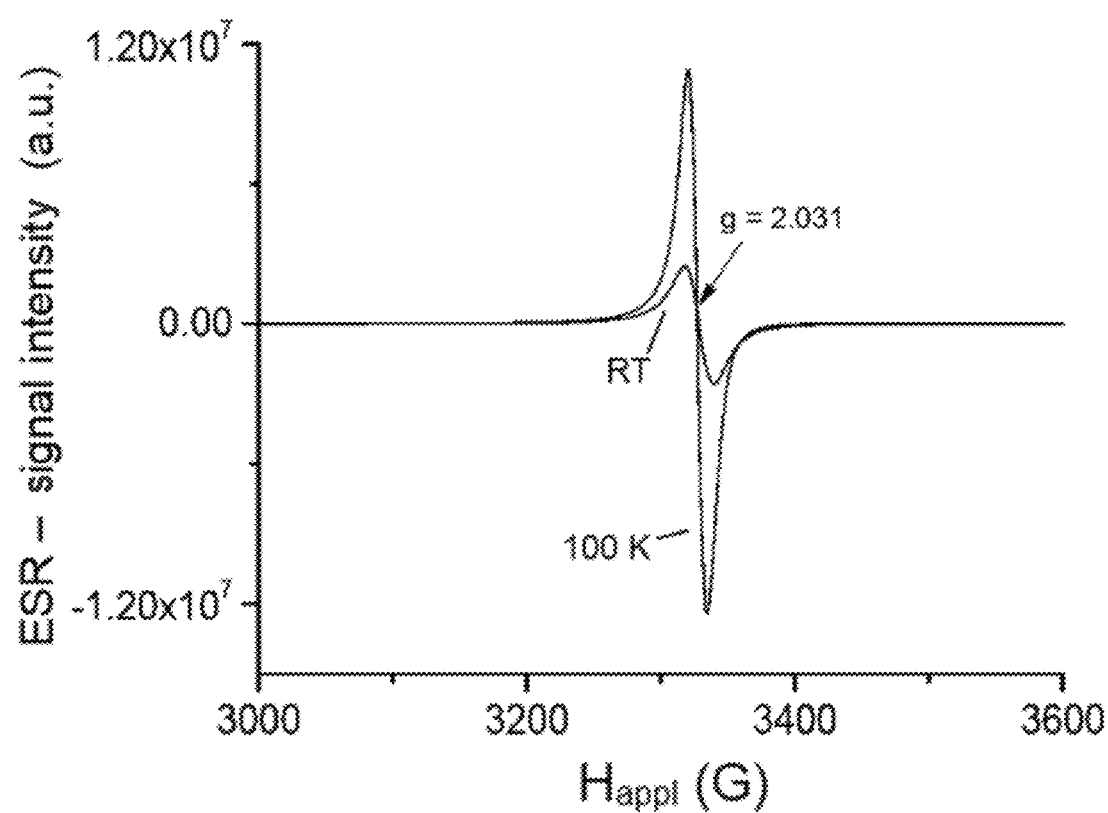
FIG. 8 ESR spectra of ultramarine at 100 K and room temperature.

The ESR spectrum of ultramarine contained a narrow isotropic signal that was attributable to the $S_3$ radical; see FIG. 8. Typical temperature behaviour was observed for purely paramagnetic centres, i.e. the intensity rose with falling temperature.

Example 5: Inventive Extrudates Containing Ultramarine Blue

Various extrudates containing ultramarine blue are produced and the ESR spectra are measured. FIG. 10 shows the spectra of different extrudate samples measured at 20° C., normalized to the same sample mass of 50 mg. Extrudate 2 shows a weak signal at about 3400 G, which may be attributable to $Cu^{2+}$ species, even though no typical hyperfine structure of $Cu^{2+}$ is visible. The origin of the weak signals at around 3600 G in extrudates 1 and 2 is unclear. It is possibly due to a paramagnetic defect. Extrudates 3 and 4 show a strong ESR signal of ultramarine blue.

Example 6: Inventive Pastes Containing Ultramarine Blue

Figure 11:
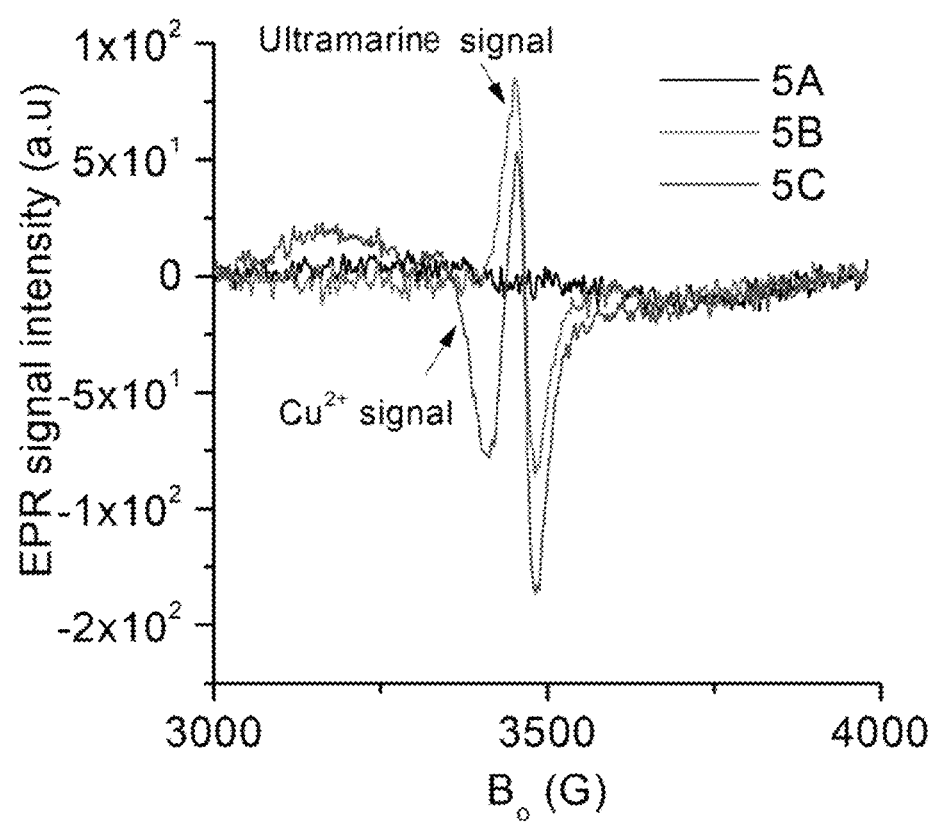
FIG. 11 ESR spectra of various pastes containing ultramarine blue.

FIG. 11 shows the ESR spectra of three different paste samples each of 50 mg, measured at 20° C. Pastes 5A and 5B show the ESR signals of ultramarine blue, and paste 5C the signal of $Cu^{2+}$.

Example 7: Inventive Pastes Containing TEMPO

FIG. 12 shows the ESR spectra of various paste samples (50 mg each) mixed with 0.02 mg of 2,2,6,6,6-tetramethyl-1-piperidinyloxyl (TEMPO radical), measured at 20° C. A) TEMPO signal; B) ultramarine blue signal (paste 5B and 5C, and $Cu^{2+}$ signal (paste 5C). The samples were prepared by mixing the individual paste with the TEMPO solution in acetone; the ESR spectra were measured after the evaporation of acetone (100 µl).

Example 8: Inventive Pastes Containing $TiO_2/SiO_2$

FIG. 13 shows ESR spectra of various paste samples (50 mg each) mixed with 20 mg of $TiO_2/SiO_2$, measured at 20° C. The samples were produced by mixing the individual pastes with solid $TiO_2/SiO_2$.

Example 9: Inventive Pastes Containing Doped MgO

FIG. 14 shows ESR spectra of various paste samples (40 mg each) mixed with 10 mg of MgO with an Mn(II) contaminant (Mn in MgO<1%), measured at 20° C. A) ESR signal of the isolated $Mn^{2+}$ ion in the MgO matrix; B) ESR spectra of (A), but with different range of X and Y axes in order to show the slightly masked EPR signal of ultramarine. For comparison, the ESR spectra of pastes C and B were incorporated into this figure.

For examples 10 to 12 below, ESR measurements of the marked samples and marking mixtures below, with technically relevant functions and approval-relevant toxic and environmentally relevant unobjectionability, were carried out as follows:

The samples for ESR measurements may be analysed as solids or liquids. For solid substances, a fused silica sample tube was used with corresponding sample quantity of around 10-1000 mg (depending on sample tube diameter). For liquid samples a volume of around 50 µl was used, drawn up via glass capillary. The glass capillary was subsequently inserted into a fused silica sample tube for the measurement. Prior to measurement of the samples, the instrument underwent a heating-up cycle, which takes 15 min and reaches a final temperature of around 31° C. The temperature range during the measurements was 31±2° C. The sample tube was subsequently introduced into the measuring cell (ideally with the central part of the sample (mid-height of the sample in the sample tube) at a distance of 62 mm from the sample holder surrounding the sample tube at the upper end). The measurements took place with a modulation of 0.2 mT and 10 mW microwave power for a sweep time of 60 seconds over the magnetic field range 0 to 400 mT. After the measurement the ESR spectrum was analysed for possible characteristic peaks. These peaks were characterized by their position in the magnetic field, their intensity (intensity/height), their width, their area, their individual appearance and, in the event of multiple peaks being detected, via their distance from one another. The position in this case is typically reported either as a magnetic flux density (B) in milliteslas or dimensionlessly as a factor referred to as the g-factor. The ESR measurements were carried out using the MS 5000 (11-0185) instrument from Freiberg Instruments GmbH (Freiberg, Germany). For the sake of simplicity the samples measured were divided into (++)=signal without prior excitation, (+)=signal with excitation by x-rays and (−)=no signal.

Compounds/Mixtures Used and Measured:
  copper(II) sulfate (++) natural signal, stable in the majority of matrices
  manganese(II) chloride (++), ditto, but with more redox variation, functional manganese(IV) oxide (++), very characteristic coupling signal, functional zirconium(IV) oxide (++)/(+), weak natural signal, activatable with hard x-ray radiation lactose monohydrate (++)/(+), activatable dose-quantitatively by x-ray radiation, slight natural signal component HPMC (−), no signal, not activatable by x-ray radiation HPMCAS (−), matrix, no signal, not activatable by x-ray radiation titanium dioxide (++), more naturally significant PVP (Kollidon 30) (−), no matrix signal Eudragit® E, L, RL, FL 30 D (+), signal after x-ray irradiation, exhibits typical signal saturation, nonlinear per dose natural ultramarine blue (++), strong significant signal, extremely robust, all pigment modifications and particle sizes D(−)-mannitol (+) signal after x-ray irradiation, exhibits dose linearity diamond powder (++), local doping dependent on formation, exhibits high local resolution in the lattice magnesium oxide (++), signal, pigment ink black (carbon black and additives) (++)/(+), signal after x-ray irradiation, weak baseline signal, functional printer paper, white, primed with titanium dioxide as pigment signal (++)

printer paper with local ultramarine doping (++), signal additively to the priming signal D(+) trehalose (+), signal after x-ray irradiation microcrystalline cellulose (MCC; Avicel PH) (+), signal after x-ray irradiation polylactide-co-glycolide (Resome®) (+), signal after x-ray irradiation protein (triple-helical collagen) (+), characteristic signal after x-ray irradiation mixture of lactose monohydrate, MCC, natural ultramarine blue, diamond powder, copper(II) sulfate and magnesium oxide (coding blend).

Example 10

The coding blend described above was measured initially and later with dilution. In this case a mixture was prepared from natural ultramarine blue, diamond powder, copper(II) sulfate and magnesium oxide in equivalent masses. Added to this mixture then were lactose monohydrate and MCC (in equivalent masses of lactose monohydrate and MCC to one another). For the initial coding blend, the mixture is used relative to lactose monohydrate+MCC in ⅔:⅓ parts by weight. Thereafter coding blends with a higher proportion of lactose monohydrate+MCC are produced, with the mixture being diluted to ½, ¼ and ⅛ of the initial concentration.

The spectral curves showed the additive signal effect over the whole of the magnetic field range swept, with the greatest intensity of 4.5% (mass/mass) diluted to 2.25%, 1.125% down to a matrix dilution of 0.5625%, the lowest intensity curve, which is still far above the signal-to-noise ratio with this method, of around 10 relative intensity units as the noise limit. Surprisingly, without special purity requirements for the laboratory and the substances, as a single-point measurement, mixtures of this kind and dilutions of this kind can be utilized significantly as a marker signal down to a dilution of 0.0080%, and in fact even lower by utilization of the entire spectral information.

Example 11

Samples Activated with x-Ray Radiation
Irradiation of the Samples

An aliquot of 1 g of sample was weighed off in each case and then irradiated by x-ray radiation from a rhodium x-ray tube. This was done using the Axios DY1402 x-ray fluorescence spectrometer (Malvern Panalytical GmbH, Kassel, Germany). The current strength was 66 mA and the voltage was 60 kV. The samples were therefore exposed to a power of 3960 W. The irradiation time was 20, 30 and 40 seconds, respectively. Compounds tested were as follows:

lactose monohydrate (20 s, 30 s, 40 s)
PVP (Kollidon 30) (20 s, 30 s, 40 s)
Eudragit® L 100 (20 s, 30 s, 40 s)
diamond powder (20 s, 30 s, 40 s)
ink (black, white) (40 s)
D(−)-mannitol (20 s, 30 s, 40 s)
HPMC (20 s, 30 s, 40 s)
zirconium(IV) oxide (20 s, 30 s, 40 s)
titanium dioxide (20 s, 30 s, 40 s)
polylactide-co-glycolide (20 s, 30 s, 40 s)
protein (triple-helical collagen) (20 s, 30 s, 40 s)

With this radiation dose and wavelength, the individual compounds lactose monohydrate and D(−)-mannitol exhibit a new resonance intensity which according to dose is linear within a wide range. The spectra are significant and the substances can be mixed arbitrarily. As sugars they are suitable for foods and pharmaceutical products. Titanium oxide, in contrast, alters its spectrum as a result of irradiation, and can therefore also be used functionally in accordance with the invention as an internal marker. Titanium dioxide as well is unobjectionable and is widespread as a filling substance and pigment. With the energy pulse level of the rhodium source, conversely, spectral alteration of the kind detected with other polymers is not detected with zirconia, PVP and diamond powder. Eudragit® L 100 displays the peculiar property of generating a quantitative signal saturation quickly after x-ray irradiation (described). This effect (internal standard) is probably generated by a minor polymer product component which on a radiation is raised quasi-quantitatively into the ESR-visible modification. Functional peculiarities of this kind are striking, specific, and therefore functionally desirable for the marking according to the invention. HPMC as well, as a cellulose-based polymer, is not yet partially modified in a manner visible to ESR with this method (described). A minimal signal in the order of magnitude of the noise limit of the unoptimized method, however, shows the possibility of intrinsic marking through irradiation.

Example 12

Figure 15:
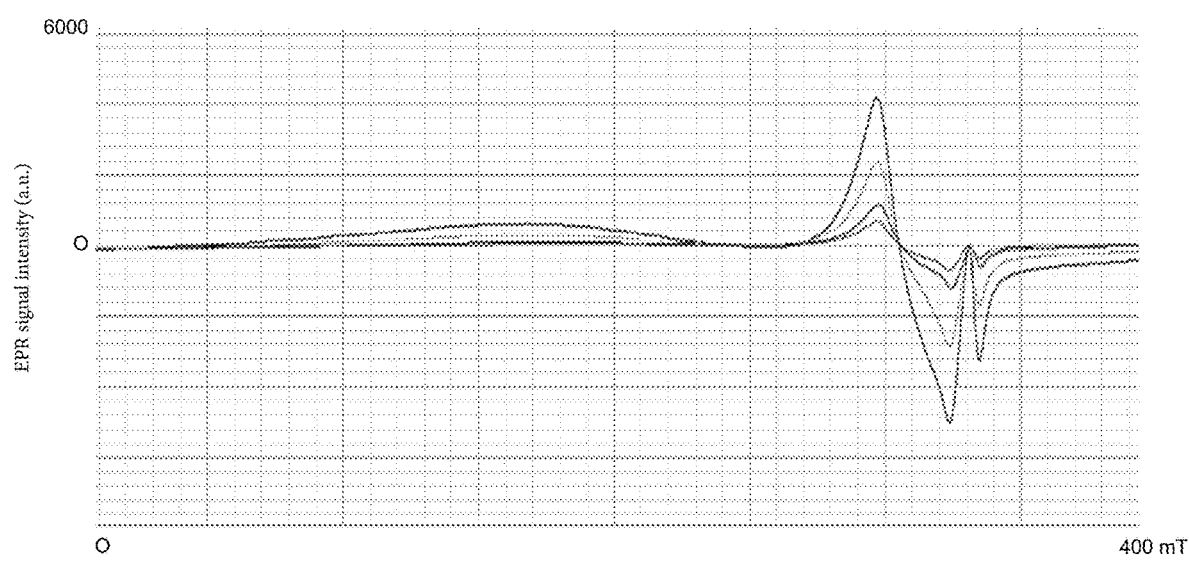
FIG. 15 ESR spectra of the compounds and the mixture of Example 11.

Lastly, all of the signal-providing mixtures used here and individual substances of Example 11 subjected to measurement were combined in a single representation (FIG. 15). This illustrates the broad use of the technically available spectral range (energy ranges of the resonances, here indicated in the usual way (magnetic flux density, B in mT). The signal width is also extremely different per marker and may be used for the specificity of signal recognition. Within a very wide dynamic range, the signals are significantly above noise and can be typified and identified easily in all of the dilutions used here in an automatic way, by spectral simulation, spectral principle component analysis and by learning routines (neural/deep learning pattern recognition/and artificial intelligence methods, fingerprint peak picking B, B-frequency-normalized mode, g-factor normalization). The significant but weak spectral component of the MgO (magnesium(II) oxide) is recognized here by methods where the eye fails, i.e. baseline resolution and baseline corrections are unnecessary for these new statistical-mathematical methods. The method is quantitatively unattained not only in process requirements, purity and ambient conditions but also in the dynamic range.

With this spectral simulation from actual individual spectra measured on the compounds identified above and irradiated sample modifications, without special-purpose methods and without any sample preparation, the experiments conducted display a dynamism which extends into the picogram range of signal recognition. The channel specificity imparted by the significant signal forms suggest a code channel depth of at least 50-100 in the sense of measurement dimensions (characteristic features or positions of the "bar" code). The measurement sensitivity here, without a special routine, was picogram per gram of sample. With the characteristic feature width and simple elevation of the measurement method in transmission power and signal acquisition, the method can be employed broadly in the femtogram range.

The method can be employed in particular in areas where physical properties, health qualities and environmental qualities are not adversely affected in any way.

The invention claimed is:

1. A method of product authentication, the method comprising:
    (a) applying or introducing an identification substance admixture comprising paramagnetic phases to/into a product or identifying the product comprising the identification substance admixture comprising paramagnetic phases, wherein the identification substance admixture has an electron spin resonance (ESR) fingerprint spectrum that permits unambiguous identification of the product;
    (b) recording the ESR fingerprint spectrum of the product;
    (c) generating and storing a digital representation of the ESR fingerprint spectrum;
    (d) measuring an ESR spectrum of a product to be authenticated and generating a digital representation of the ESR spectrum measured; and
    (e) verifying the product to be authenticated by comparing the digital representation of the ESR spectrum measured of the product to be authenticated with digital representations of stored ESR fingerprint spectra,
    wherein a verification of an authenticity of a multitude of measured ESR spectra is conducted in a common detection step, and
    wherein the common detection step uses zero-knowledge proof which enables an authentication of a calculation of a sum of multiple individual values without needing to disclose the individual values itself.

2. The method of claim 1, wherein a digital representation of a respective ESR fingerprint spectrum comprises a hash value derived from the respective ESR fingerprint spectrum.

3. The method of claim 1, wherein the digital representations of stored ESR fingerprint spectra are stored in a blockchain network in a forgery- and manipulation-proof manner.

4. The method of claim 3, wherein a distinct non-fungible token is produced on the blockchain network for each of the digital representations of stored ESR fingerprint spectra.

5. The method of claim 1, wherein the measuring (d) is executed with a mobile end device, on which a computer program that measures the ESR spectrum of the product to be authenticated using circuit components of the mobile end device is executed.

6. The method of claim 5, wherein the ESR spectrum of the product to be authenticated is measured using a permanent magnet, antenna, or external switchable circuit component.

7. The method of claim 3, wherein a distinct non-fungible token in the blockchain network is generated for each of the stored digital representations of stored ESR fingerprint spectra and every distinct ESR fingerprint spectrum in the stored ESR fingerprint spectra is assigned a distinct token in the blockchain network by means of which transactions relating to products represented by the stored ESR fingerprint spectra can be digitally imaged and executed.

* * * * *